US011159996B2

(12) United States Patent
Tao et al.

(10) Patent No.: US 11,159,996 B2
(45) Date of Patent: Oct. 26, 2021

(54) USER EQUIPMENT AND BASE STATION PARTICIPATING IN CELL MEASUREMENT PROCEDURES

(71) Applicant: PANASONIC INTELLECTUAL PROPERTY CORPORATION OF AMERICA, Torrance, CA (US)

(72) Inventors: Ming-Hung Tao, Langen (DE); Rikin Shah, Langen (DE); Hidetoshi Suzuki, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 6 days.

(21) Appl. No.: 16/659,232

(22) Filed: Oct. 21, 2019

(65) Prior Publication Data
US 2020/0053608 A1 Feb. 13, 2020

Related U.S. Application Data

(63) Continuation of application No. PCT/EP2018/060270, filed on Apr. 23, 2018.

(30) Foreign Application Priority Data

May 5, 2017 (EP) .................................... 17169800

(51) Int. Cl.
*H04W 36/00* (2009.01)
*H04B 7/06* (2006.01)

(52) U.S. Cl.
CPC ...... *H04W 36/0094* (2013.01); *H04B 7/0617* (2013.01); *H04W 36/0088* (2013.01)

(58) Field of Classification Search
CPC .......... H04W 36/0094; H04W 36/0088; H04B 7/0617
See application file for complete search history.

(56) References Cited

U.S. PATENT DOCUMENTS

| 2013/0286960 | A1 | 10/2013 | Li et al. |
| 2016/0337916 | A1 | 11/2016 | Deenoo et al. |
| 2020/0084735 | A1* | 3/2020 | Cheng ................. H04W 52/146 |

FOREIGN PATENT DOCUMENTS

WO 2017/039504 A1 3/2017

OTHER PUBLICATIONS

Extended European Search Report, dated Nov. 6, 2017, for European Application No. 17169800.4, 11 pages.

(Continued)

*Primary Examiner* — Diane D Mizrahi
(74) *Attorney, Agent, or Firm* — Seed IP Law Group LLP

(57) ABSTRACT

The present disclosure relates to a radio base station serving a user equipment in a first radio cell of a mobile communication system. The radio base station comprises processing circuitry which determines that a neighbor radio base station does not provide a beamformed reference signal to the user equipment. The neighbor radio base station controls the transmission in its neighbor radio cell of an omni-directional reference signal and the beamformed reference signal. A transmitter transmits a reference signal request to the neighbor radio base station. The reference signal request requests the neighbor radio base station to provide the beamformed reference signal to the user equipment. A receiver receives from the neighbor radio base station a reference signal request response, including information on the transmission of the requested beamformed reference signal. The transmitter transmits a notification to the user equipment, comprising information on the requested beamformed reference signal.

15 Claims, 9 Drawing Sheets

(56) References Cited

OTHER PUBLICATIONS

3GPP TR 38.801 V14.0.0, "3$^{rd}$ Generation Partnership Project; Technical Specification Group Radio Access Network; Study on new radio access technology: Radio access architecture and interfaces (Release 14)," Mar. 2017, 91 pages.
3GPP TR 38.804 V14.0.0, "3$^{rd}$ Generation Partnership Project; Technical Specification Group Radio Access Network; Study on New Radio Access Technology; Radio Interface Protocol Aspects (Release 14)," Mar. 2017, 57 pages.
3GPP TR 38.913 V14.2.0, "3$^{rd}$ Generation Partnership Project; Technical Specification Group Radio Access Network; Study on Scenarios and Requirements for Next Generation Access Technologies; (Release 14)," Mar. 2017, 38 pages.
3GPP TS 36.211 V14.2.0, "3$^{rd}$ Generation Partnership Project; Technical Specification Group Radio Access Network; Evolved Universal Terrestrial Radio Access (E-UTRA); Physical channels and modulation (Release 14)," Mar. 2017, 194 pages.
3GPP TS 36.331 V14.2.2, "3$^{rd}$ Generation Partnership Project; Technical Specification Group Radio Access Network; Evolved Universal Terrestrial Radio Accss (E-UTRA); Radio Resource Control (RRC); Protocol specification (Release 14)," Apr. 2017, 721 pages.
3GPP TS 36.423 V14.2.0, "3$^{rd}$ Generation Partnership Project; Technical Specification Group Radio Access Network; Evolved Universal Terrestrial Radio Access Network (E-UTRAN); X2 application protocol (X2AP) (Release 14)," Mar. 2017, 242 pages.
3GPP TS 36.455 v14.1.0, "3$^{rd}$ Generation Partnership Project; Technical Specification Group Radio Access Network; Evolved Universal Terrestrial Radio Access (E-UTRA); LTE Positioning Protocol A (LPPa) (Release 14)," Mar. 2017, 73 pages.
3GPP TS 38.300 V0.2.0, "3$^{rd}$ Generation Partnership Project; Technical Specification Group Radio Access Network; NG Radio Access Network; Overall Description; Stage 2 (Release 15)," May 2017, 33 pages.
International Search Report, dated Jun. 4, 2018, for International Application No. PCT/EP2018/060270, 3 pages.

* cited by examiner

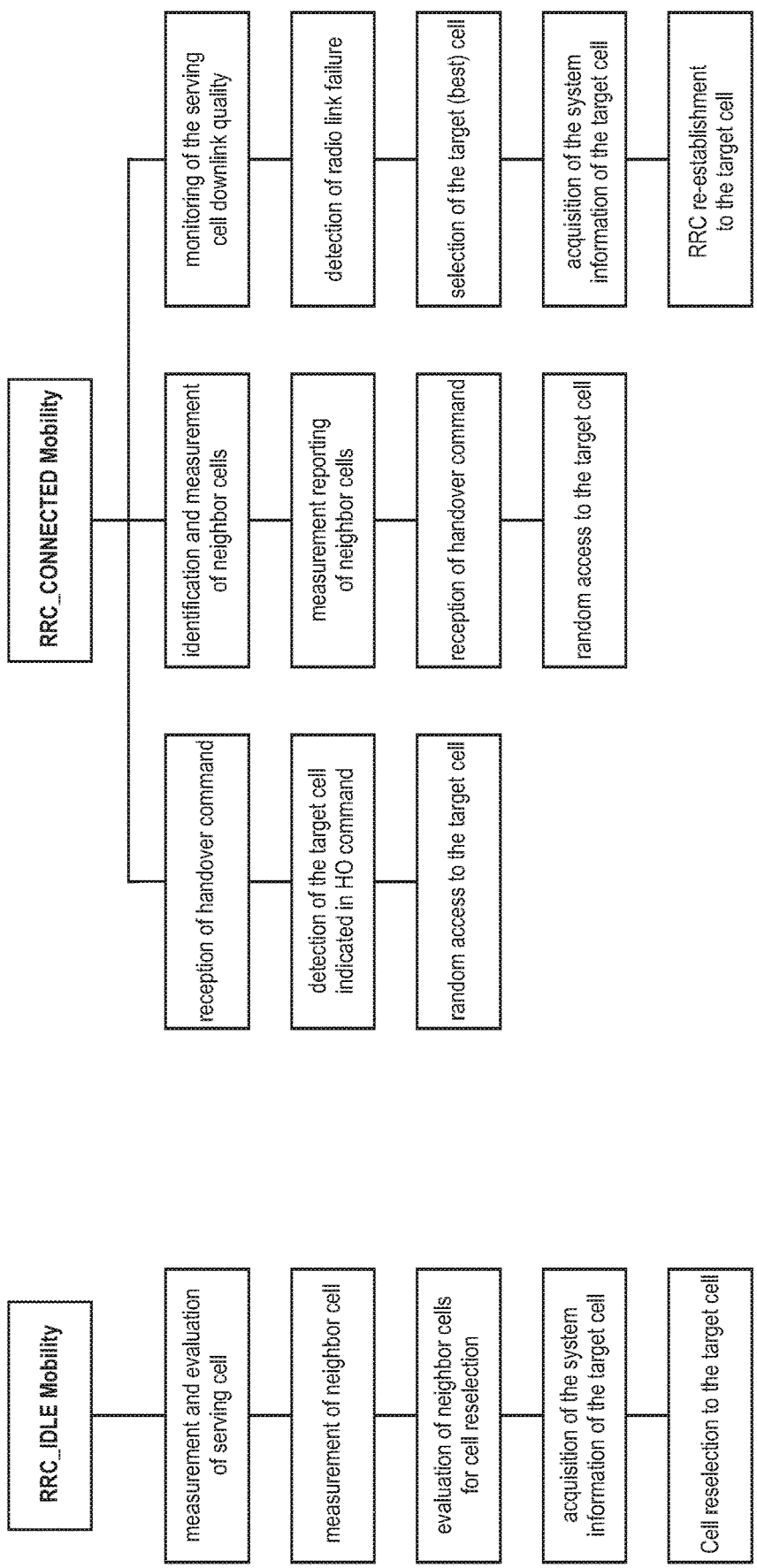

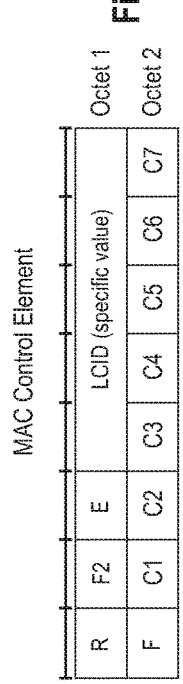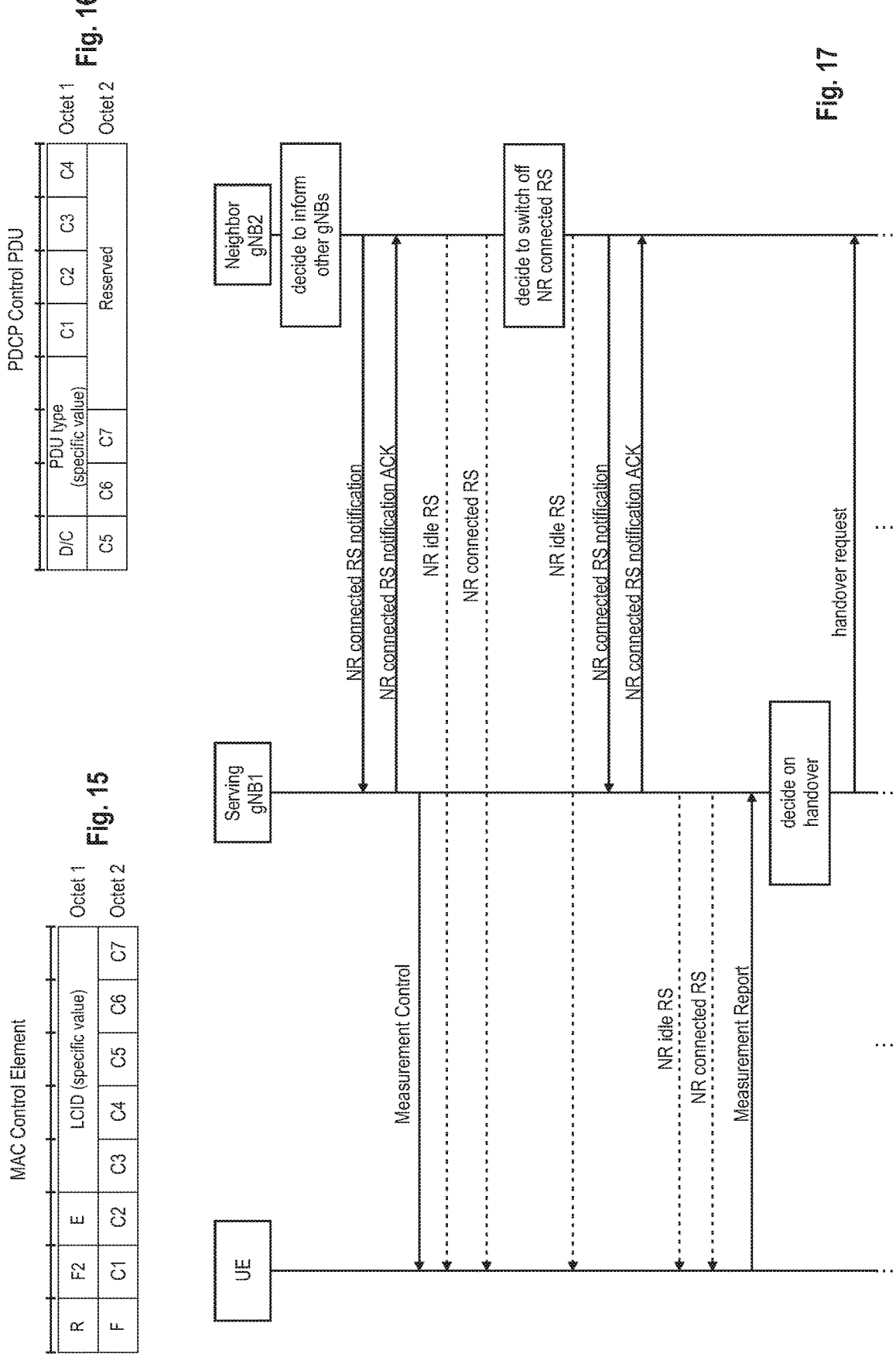

USER EQUIPMENT AND BASE STATION PARTICIPATING IN CELL MEASUREMENT PROCEDURES

BACKGROUND

Technical Field

The present disclosure is directed to methods, devices and articles in communication systems, such as, 3GPP communication systems.

Description of the Related Art

Currently, the 3rd Generation Partnership Project (3GPP) works at the next release (Release 15) of technical specifications for the next generation cellular technology, which is also called fifth generation (5G). At the 3GPP Technical Specification Group (TSG) Radio Access network (RAN) meeting #71 (Gothenburg, March 2016), the first 5G study item, "Study on New Radio Access Technology" involving RAN1, RAN2, RAN3 and RAN4 was approved and is expected to become the Release 15 work item that defines the first 5G standard. The aim of the study item is to develop a "New Radio (NR)" access technology (RAT) which operates in frequency ranges up to 100 GHz and supports a broad range of use cases, as defined during the RAN requirements study (see, e.g., 3GPP TR 38.913 "Study on Scenarios and Requirements for Next Generation Access Technologies", current version 14.2.0 available at www.3gpp.org and incorporated herein its entirety by reference).

One objective is to provide a single technical framework addressing all usage scenarios, requirements and deployment scenarios defined in TR 38.913, at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks. A second objective is to achieve forward compatibility. Backward compatibility to Long Term Evolution (LTE, LTE-A) cellular systems is not required, which facilitates a completely new system design and/or the introduction of novel features.

The fundamental physical layer signal waveform will be based on OFDM, with potential support of a non-orthogonal waveform and multiple access. For instance, additional functionality on top of OFDM such as DFT-S-OFDM, and/or variants of DFT-S-OFDM, and/or filtering/windowing is further considered. In LTE, CP-based OFDM and DFT-S-OFDM are used as waveform for downlink and uplink transmission, respectively. One of the design targets in NR is to seek a common waveform as much as possible for downlink, uplink and sidelink.

Besides the waveform, some basic frame structure(s) and channel coding scheme(s) will be developed to achieve the above-mentioned objectives. The study shall also seek a common understanding on what is required in terms of radio protocol structure and architecture to achieve the above-mentioned objectives. Furthermore, the technical features which are necessary to enable the new RAT to meet the above-mentioned objectives shall be studied, including efficient multiplexing of traffic for different services and use cases on the same contiguous block of spectrum.

Since the standardization for the NR of $5^{th}$ Generation systems of 3GPP is at the very beginning, there are several issues that remain unclear. For instance, there has been an ongoing discussion about how to support the downlink transmission of reference signals respectively synchronization signals for UEs. These reference/synchronization signals can be used by the UEs for a variety of purposes such as cell synchronization, performing measurements to determine the channel quality and/or in the context of RRM (Radio Resource Management) measurements for UE mobility (e.g., for UEs in RRC IDLE Mode and/or RRC CONNECTED Mode). It is important to establish and define processes that allow the reference/synchronization signals to be fully used by the gNBs and UEs, so as to obtain the most benefits.

BRIEF SUMMARY

One non-limiting and exemplary embodiment facilitates providing an improved (cell) measurement procedure, where different entities (UE, gNBs) are participating.

In one general aspect, the techniques disclosed here feature a radio base station serving a user equipment in a first radio cell of a mobile communication system. The radio base station comprises processing circuitry which determines that a neighbor radio base station does not provide a beamformed reference signal to the user equipment. The neighbor radio base station controls the transmission in its neighbor radio cell of an omni-directional reference signal and the beamformed reference signal. A transmitter of the radio base station transmits a reference signal request to the neighbor radio base station. The reference signal request requests the neighbor radio base station to provide the beamformed reference signal to the user equipment. A receiver of the radio base station receives from the neighbor radio base station a reference signal request response, including information on the transmission of the requested beamformed reference signal. The transmitter transmits a notification message to the user equipment, comprising information on the requested beamformed reference signal.

In one general aspect, the techniques disclosed here feature a radio base station of a mobile communication system that controls transmission of an omni-directional reference signal and a beamformed reference signal in a first radio cell of the radio base station. The radio base station comprises processing circuitry, which determines to transmit information on the beamformed reference signal to one or more neighbor radio base stations. A transmitter of the radio base station transmits a reference signal notification message to the one or more neighbor radio base stations, comprising scheduling information of the beamformed reference signal to allow identifying the radio resources used by the radio base station to transmit the beamformed reference signal.

In one general aspect, the techniques disclosed here feature a user equipment in a mobile communication system. The user equipment comprises processing circuitry, which determines that a neighbor radio base station does not provide a beamformed reference signal to the user equipment. The neighbor radio base station controls the transmission in its neighbor radio cell of an omni-directional reference signal and the beamformed reference signal. A transmitter of the user equipment transmits a reference signal request to a serving radio base station serving the user equipment. The reference signal request requests the serving radio base station to request the neighbor radio base station to provide the beamformed reference signal to the user equipment. A receiver of the user equipment receives from the serving radio base station a notification message, comprising information on the requested beamformed reference signal.

In one general aspect, the techniques disclosed here feature a method for operating a radio base station serving a user equipment in a first radio cell of a mobile communication system. The method comprises the following steps performed by the radio base station. It is determined that a neighbor radio base station does not provide a beamformed reference signal to the user equipment. The neighbor radio base station controls the transmission in its neighbor radio cell of an omni-directional reference signal and the beamformed reference signal. A reference signal request is transmitted to the neighbor radio base station, wherein the reference signal request requests the neighbor radio base station to provide the beamformed reference signal to the user equipment. From the neighbor radio base station a reference signal request response to the received, including information on the transmission of the requested beamformed reference signal. A notification message is transmitted to the user equipment, comprising information on the requested beamformed reference signal.

In one general first aspect, the techniques disclosed here feature a method for operating a user equipment in a mobile communication system. The method comprises the following steps performed by the user equipment. It is determined that a neighbor radio base station does not provide a beamformed reference signal to the user equipment. The neighbor radio base station controls the transmission in its neighbor radio cell of an omni-directional reference signal and the beamformed reference signal. A reference signal request is transmitted to a serving radio base station serving the user equipment. The reference signal request requests the serving radio base station to request the neighbor radio base station to provide the beamformed reference signal to the user equipment. A notification message is received from the serving radio base station, comprising information on the requested beamformed reference signal.

It should be noted that general or specific embodiments may be implemented as a system, a method, an integrated circuit, a computer program, a storage medium, or any selective combination thereof.

Additional benefits and advantages of the disclosed embodiments will be apparent from the specification and Figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIGS. 6 and 7 illustrates an overview of mobility-related RRM actions for respectively RRC IDLE and RRC CONNECTED, FIG. 15 illustrates an exemplary MAC Control Element that can be use for the UE-initiated reference signal request message, FIG. 16 illustrates an exemplary PDCP Control PDU that can be use for the UE-initiated reference signal request message, and FIG. 17 illustrates a signaling diagram for an improved inter-gNB coordination procedure initiated by a neighbor gNB.

DETAILED DESCRIPTION

Basis of the Present Disclosure

5G NR System Architecture and Protocol Stacks

As presented in the background section, 3GPP is working at the next release for the $5^{th}$ generation cellular technology, simply called 5G, including the development of a new radio access technology (NR) operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology". Results and agreements are collected in the Technical Report TR 38.804 v14.0.0, incorporated herein in its entirety by reference.

Figure 1:
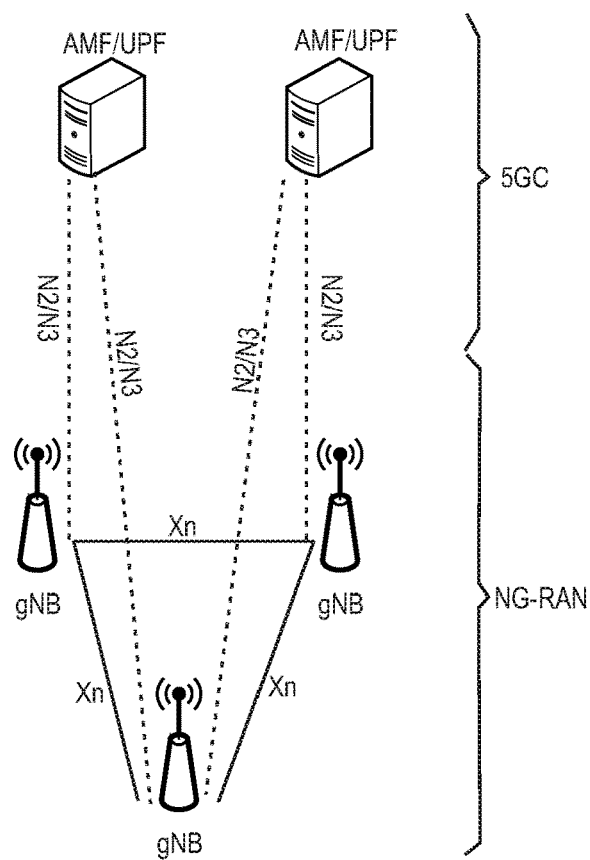
FIG. 1 shows an exemplary architecture for a 3GPP NR system.

Among other things, there has been a provisional agreement on the overall system architecture. The NG-RAN (Next Generation—Radio Access Network) consists of gNBs, providing the NG-Radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) by means of the N2 interface and to the UPF (User Plane Function) by means of the N3 interface. The NG-RAN architecture is illustrated in FIG. 1, as taken from the TS 38.300 v.2.0, section 4 incorporated herein by reference.

Figure 2:
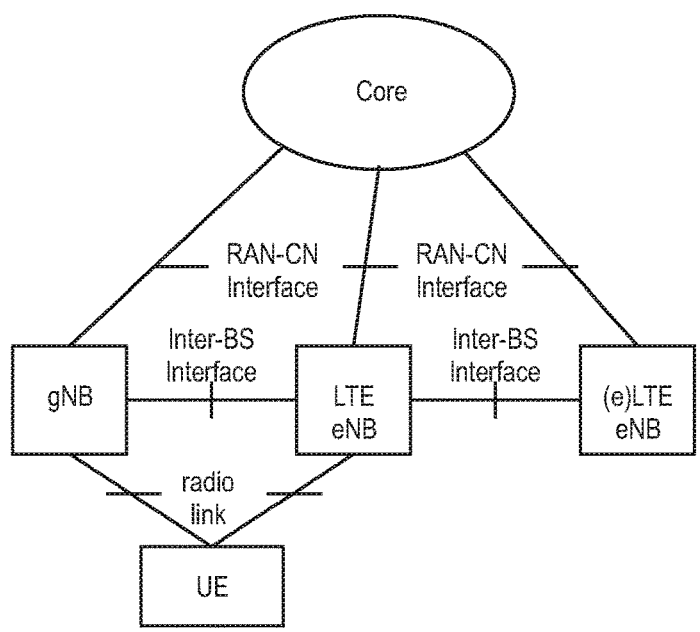
FIG. 2 shows an exemplary user and control plane architecture for the LTE eNB, gNB, and UE.

Various different deployment scenarios are currently being discussed for being supported, as reflected, e.g., in 3GPP TR 38.801 v14.0.0 incorporated herein by reference in its entirety. For instance, a non-centralized deployment scenario (section 5.2 of TR 38.801; a centralized deployment is illustrated in section 5.4) is presented therein, where base stations supporting the 5G NR can be deployed. FIG. 2 illustrates an exemplary non-centralized deployment scenario and is based on FIG. 5.2.-1 of TR 38.301, while additionally illustrating an LTE eNB as well as a user equipment (UE) that is connected to both a gNB and an LTE eNB (which is to be understood as an eNB according to previous 3GPP standard releases such as for LTE and LTE-A). As mentioned before, the new eNB for NR 5G may be exemplarily called gNB.

An eLTE eNB, as exemplarily defined in TR 38.801, is the evolution of an eNB that supports connectivity to the EPC (Evolved Packet Core) and the NGC (Next Generation Core).

Figure 4:
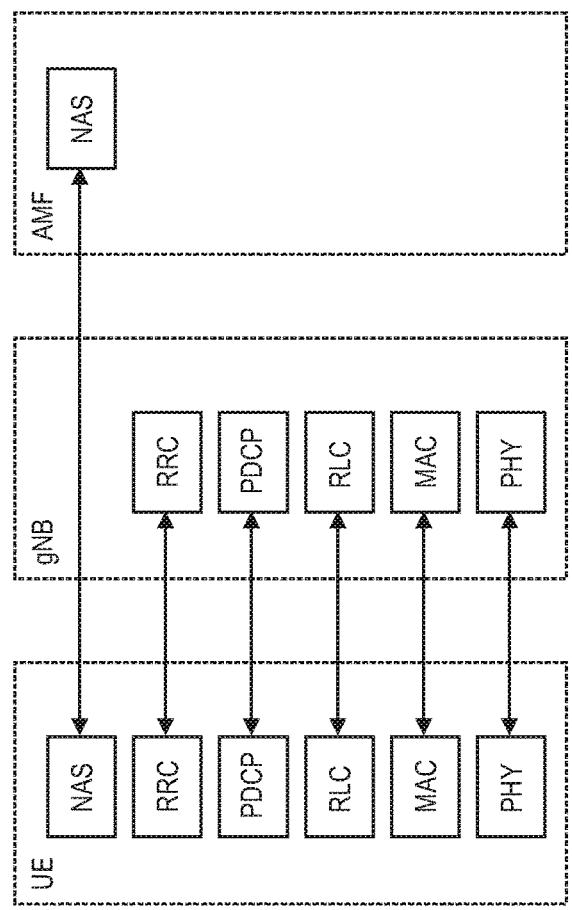
FIG. 4 illustrates the control plane protocol stack for 5G NR.
Figure 3:
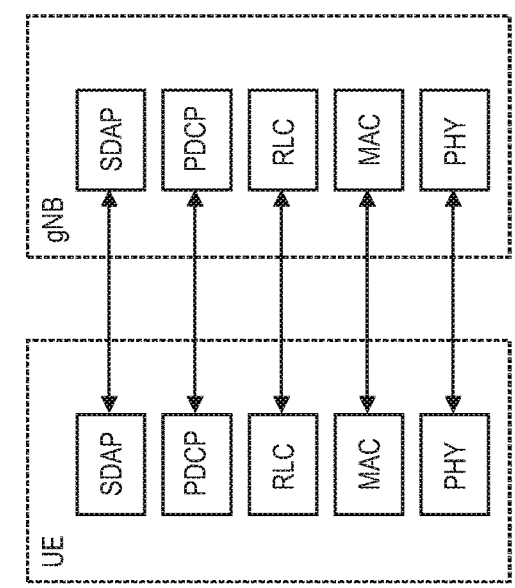
FIG. 3 illustrates the user plane protocol stack for 5G NR.

The user plane protocol stack for NR is illustrated in FIG. 3, as currently defined in TS 38.300 v0.2.0, section 4.4.1. The PDCP, RLC and MAC sublayers are terminated in the gNB on the network side. Additionally, a new access stratum (AS) sublayer (SDAP, Service Data Adaptation Protocol) is introduced above PDCP as described in sub-clause 6.5 of S TS 38.300 v0.2.0. The control plane protocol stack for NR is illustrated in FIG. 4, as defined in TS 38.300, section 4.4.2. An overview of the Layer 2 functions is given in sub-clause 6, of TS 38.300. The functions of the PDCP, RLC and MAC sublayers are listed in sub-clauses 6.4, 6.3, and 6.2 of TS 38.300. The functions of the RRC layer are listed in sub-clause 7 of TS 38.300. The mentioned sub-clauses of TS 38.300 v0.2.0 are incorporated herein by reference.

The new NR layers exemplarily assumed at present for the 5G systems may be based on the user plane layer structure currently used in LTE(-A) communication systems. However, it should be noted that no final agreements have been reached at present for all details of the NR layers.

RRC States

In LTE, the RRC state machine consists of only two states, the RRC idle state which is mainly characterized by high power savings, UE autonomous mobility and no established UE connectivity towards the core network, and the RRC connected state in which the UE can transmit user plane data while mobility is network-controlled to support lossless service continuity.

The RRC in NR 5G as currently defined in section 5.5.2 of TR 38.804 v14.0.0, incorporated herein by reference, supports the following three states, RRC Idle, RRC Inactive, and RRC Connected, and allows the following state transitions as defined in TR 38.804.

As apparent, a new RRC state, inactive, is defined for the new radio technology of 5G 3GPP, so as to provide benefits when supporting a wider range of services such as the eMBB (enhanced Mobile Broadband), mMTC (massive Machine Type Communications) and URLLC (Ultra-Reliable and Low-Latency Communications) which have very different requirements in terms of signalling, power saving, latency, etc. The new RRC inactive state shall thus be designed to allow minimizing signaling, power consumption and resources costs in the radio access network and core network while still allowing, e.g., to start data transfer with low delay.

LTE Handover Procedure

Mobility is a key procedure in LTE communication system. There are two types of handover procedures in LTE for UEs in active mode: the S1-handover and the X2-handover procedure. For intra-LTE mobility, the handover via the X2 interface is normally used for the inter-eNodeB mobility. Thus, the X2 handover is triggered by default unless there is no X2 interface established or the source eNodeB is configured to use another handover (e.g., the S1-handover) instead.

Figure 5:
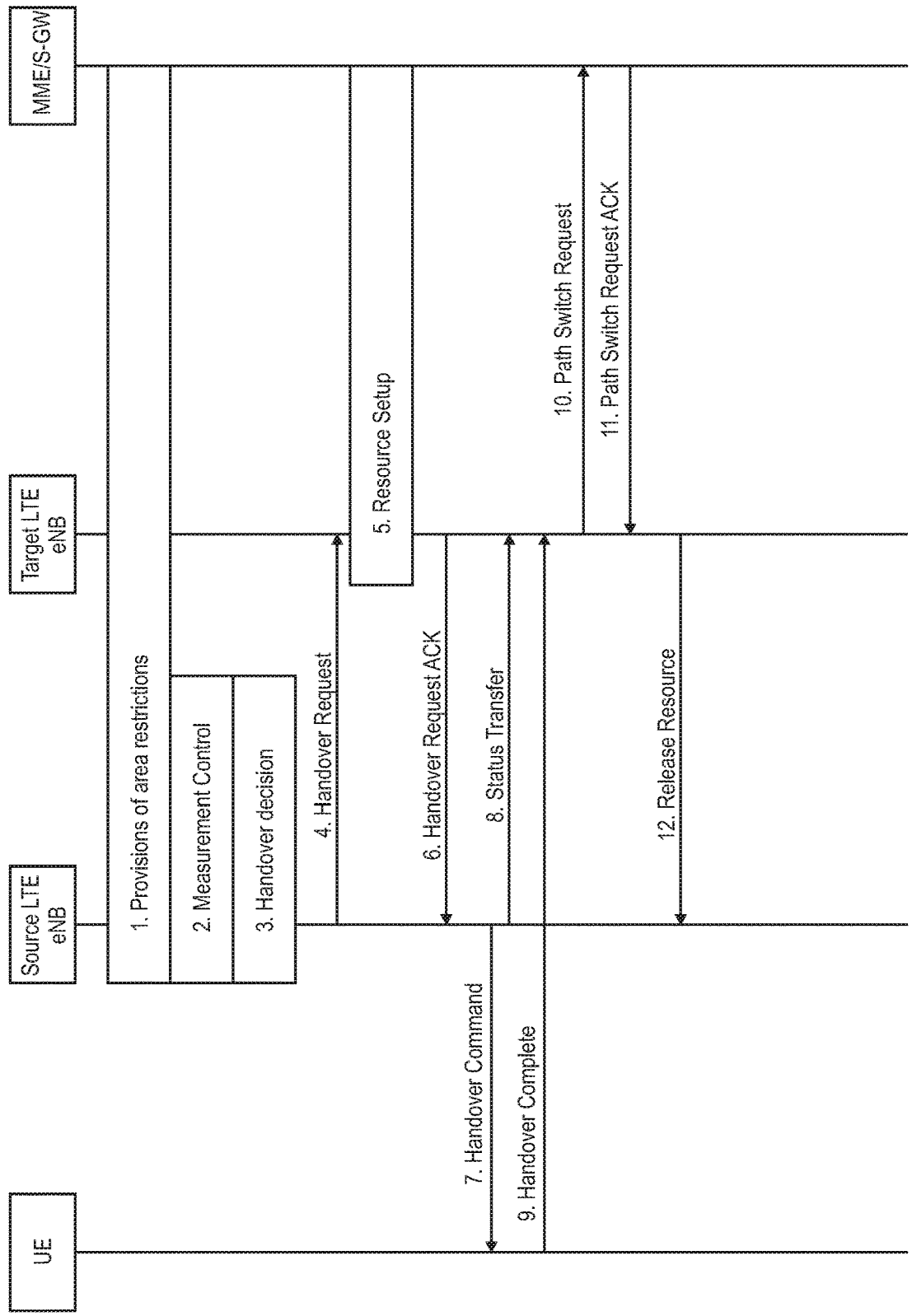
FIG. 5 illustrates an exemplary signaling diagram for a X2 handover procedure of the LTE communication systems.

FIG. 5 gives a brief exemplary and simplified overview of the X2 intra-LTE handover.

The X2 handover comprises a preparation phase (steps 4 to 6), an execution phase (steps 7 to 9) and a completion phase (after step 9). The X2 intra-LTE handover is directly performed between two eNodeBs. Other entities of the core network (e.g., the MME, Mobility Management Entity) are informed only at the end of the handover procedure once the handover is successful, in order to trigger a path switch to the new eNB. Step 2, termed Measurement Control, refers to the cell measurement procedure and measurement reporting procedure performed between the UE and the serving eNodeB (here "Source LTE eNB"). As will become apparent later, the present application provides improved procedures mainly with regard to the above step 2.

The status transfer message in step 8 provides the sequence number and the hyper frame number which the target eNodeB should assign to the first packet with no sequence number yet assigned that it must deliver.

More information on mobility procedures in LTE can be obtained, e.g., from 3GPP TS 36.331 v14.2.2, section 5.4 incorporated herein by reference, and from 3GPP 36.423 v14.2.0 section 8.2 incorporated herein by reference.

LTE-(A)—Synchronization Signals, Reference Signals and RRM Measurements

A user equipment wishing to access an LTE cell must first undertake a cell search procedure so as to determine time and frequency parameters that are necessary to demodulate the downlink and to transmit uplink signals with the correct timing. The cell search procedure in LTE begins with a synchronization procedure which makes use of two specially designed physical signals that are broadcast in each cell: the Primary Synchronization Signal (PSS) and the Secondary Synchronization signal (SSS). These two signals not only enable time and frequency synchronization, but also provide the UE with the physical layer identity of the cell and a cyclic prefix length, additionally informing the UE whether the cell uses Frequency Division Duplex (FDD) or Time Division Duplex (TDD).

The PSS and SSS are transmitted periodically, twice per 10 ms radio frame. In an FDD cell, the PSS is always located in the last OFDM (Orthogonal Frequency Division Multiplexing) symbol of the first and $11^{th}$ slots of each radio frame, thus enabling the UE to acquire the slot boundary timing independently of the cyclic prefix length. The SSS is located in the symbol immediately preceding the PSS. In a TDD cell, the PSS is located in the third OFDM symbol of the $3^{rd}$ and $13^{th}$ slots, while the SSS is located 3 symbols earlier. The PSS and SSS are transmitted in the central 6 resource blocks, enabling the frequency mapping of these synchronization signals to be invariant with respect to the system bandwidth and thus allowing the UE to synchronize to the network without any a-priori knowledge of the allocated bandwidth.

More detailed information on the LTE reference signals and LTE synchronization signals (e.g., the PSS and SSS structure), can be found, e.g., in TS 36.211 version 14.2.0 sections 6.10 "Reference signals" and 6.11 "Synchronization signals", both of which are incorporated herein by reference.

Once synchronization between the eNodeB and UE has been achieved, LTE is a coherent communication system which uses equalization and detection algorithms exploiting the knowledge of the channel impulse response (CIR). Optimal reception by coherent detection typically requires accurate estimation of the propagation channel. For this purpose known reference signals are inserted into the transmitted signal structure. In order to estimate the channel as accurately as possible, all correlations between channel coefficients in time, frequency and space should be taken into account. Since reference signals are sent only on particular OFDM resource elements (i.e., on particular OFDM symbols on particular subcarriers), channel estimates for the resource elements which do not bear reference signals have to be computed via interpolation.

In the LTE downlink, at least five different types of reference signals are provided:
- the Cell-Specific reference signals (often referred to as common reference) signal;
- the UE-specific reference signals (often known as DeModulation Reference Signal, DM-RS);
- the MBSFN-specific reference signals, which are used only for multimedia broadcast single frequency network operation;
- the Positioning reference signals, which from Release 9 onwards may be embedded in certain positioning subframes for the purpose of UE location measurements; and
- Channel State Information (CSI) reference signals, which are introduced in Release 10 specifically for the purpose of estimating the downlink channel state and not for data demodulation.

The UE-specific reference signals may be transmitted in addition to the cell-specific reference signals and are embedded only in the resource blocks to which the PDSCH is mapped for those UEs. If UE-specific reference signals are transmitted, the UE is expected to use them to derive the channel estimate for demodulating the data in the corresponding PDSCH resource blocks. A typical usage of the UE-specific reference signals is to enable beamforming of the data transmissions to specific UEs. The eNodeB may use a correlated array of physical antenna elements to generate a narrow beam in the direction of a particular UE. The narrow beam experiences a different channel response between the eNodeB and UE, thus making use of the UE-specific reference signals to enable the UE to demodulate beamformed data coherently. In Release 9 the UE-specific reference signals have been newly designed in order to extend support to dual layer transmission, which may include the transmission of two spatial layers to one UE.

In communication systems according to LTE, Radio Resource Management (RRM) encompasses a wide range of techniques and procedures, including power control, scheduling, cell search, cell reselection, handover, radio link or connection monitoring, and connection establishment and re-establishment. Cell Search within E-UTRAN (LTE) is one of the most fundamental aspects of mobility and enables the UE to acquire the carrier frequency, timing and Physical Cell Identity (PCI).

Further, RRM-related actions undertaken by the UE can be broadly divided into those relevant in the RRC-IDLE state and those relevant in the RRC-CONNECTED state. An overview of mobility related RRM actions for RRC IDLE and RRC CONNECTED is given in FIG. 6 and FIG. 7.

Mobility for RRC-IDLE UEs may involve the measurement and evaluation of the serving cell, the measurement of neighbor cells, the evaluation of neighbor cells for cell reselection, the acquisition of the system information of the target cell, and the cell reselection to the target cell. Mobility for RRC-CONNECTED UEs distinguishes between different scenarios, as depicted in FIG. 7.

The measurement of the serving cell and any neighboring cells is usually performed in a regular manner by the UEs. This may also involve the transmission of measurement reports from the UE to its service eNB.

The UE reports the measurement information in accordance with the measurement configuration provided by E-UTRAN and applicable for a UE in RRC_Connected state. The measurement configuration can be provided to the UE by means of dedicated signaling, e.g., using the RRC-ConnectionReconfiguration or RRCConnectionResume message. The UE can be configured to report measurement information to the eNB so as to support the control of UE mobility. The following measurement configuration elements can be signaled via the RRCConnectionReconfiguration message.

Measurement objects: A measurement object define on what the UE should perform the measurements—such as a carrier frequency. The measurement object may include a list of cells to be considered as well as associated parameters (e.g., frequency or cell-specific offsets).

Reporting configurations: A reporting configuration consists of the (periodic or event-triggered) criteria which cause the UE to send a measurement report, as well as the details of what information the UE is expected to report (e.g., the quantities, such as Received Signal Code Power (RSCP) for UMTS or Reference Signal Received Power (RSRP) for LTE).

Measurement identities: These identify a measurement and define the applicable measurement object and reporting configuration.

Quantity configurations: The quantity configuration defines the filtering to be used on each measurement.

Measurement gaps: Measurement gaps define time periods when no uplink or downlink transmissions will be scheduled so that the UE may perform the measurements.

In LTE, several events A1-A5, B1, B2 are defined for event triggered measurement reporting, such as when a serving cell becomes better than an absolute threshold (A1) or becomes worse than an absolute threshold (A2), or a neighbor cell becomes better than an offset relative to the serving cell (A3). Events B1 and B2 are provided for inter-RAT (Radio Access Technology) mobility, where event B1 is triggered when a neighbor cell becomes better than an absolute threshold and event B2 is triggered when a serving cell becomes worse than an absolute threshold and neighbor cell becomes better than another absolute threshold.

The E-UTRAN can influence the entry condition by setting the value of some configurable parameters used in these conditions, for example one or more of the threshold, an offset, etc.

In addition to event-triggered reporting, the UE may be configured to perform periodic measurement reporting. In this case, some of the parameters may be configured as for the event triggered reporting, except that the UE starts reporting immediately rather than only after the occurrence of an event.

In a measurement report message, the UE only includes measurement results related to a single measurement, in other words, measurements are not combined for reporting purposes. If multiple cells triggered the report, the UE includes the cells in order of decreasing value of the reporting quantity, i.e., the best cell is reported first.

More detailed information can be found in the technical specification 3GPP TS 36.331, version 14.2.2 section 5.5 "Measurements" incorporated herein by reference.

5G NR—Synchronization Signals, Reference Signals and RRM Measurements

Also for the 5G NR communication systems, synchronization signals and reference signals are expected to be necessary, but have to be designed to enable the UEs and gNBs to meet the diverse requirements imposed by the new 5G NR technology.

It is expected that in NR beamforming will be widely used in higher frequency, since at least the data channels must be beamformed to achieve the high data rates required for the new 5G radio technology systems. Therefore, to enable a UE in RRC CONNECTED state to detect a reference signal for RRM measurements while receiving beamformed data channels, the reference signals may also be beamformed such that their signal strength and signal strength of the data channels are within the UE receiver's dynamic range. Moreover, in higher-frequency deployments that rely on beamforming, the SINR (signal to interference plus noise ratio) could significantly drop quite fast, e.g., due to beam blockage, shadowing, etc. Thus, a robust mobility procedure would require synchronizations and/or reference signals for measurements to be available at least more frequently for UEs in RRC CONNECTED mode than for UEs in RRC IDLE mode.

It has been discussed so far with regard to the 5G NR communication systems that for RRM measurements for (Layer 3) mobility always-on reference signals would be used, at least for UEs in RRC IDLE state, that should also provide a substantially omni-directional coverage. Omni-directionality of the reference signal could be achieved by using an omni-directional transmission pattern, which expands to all directions of the radio cell at the same time. Alternatively, omni-directionality of the reference signal could also be achieved by using a beam transmission pattern which is substantially only covering a specific direction (area) of the radio cell, but where the beam is "swept" over the whole radio cell so as thus achieve omni-directionality within a particular time period needed for the sweeping process to reach the initial direction.

On the other hand, for RRC CONNECTED state UEs, the possibility of using one or more additional reference signals, possibly transmitted in a beam fashion, is currently being discussed. The additional reference signal for 5G NR could be similar to the CSI-reference signals already defined for LTE (see above discussion), and/or may include a still further reference signal which is designed separately therefrom. Using additional and/or different reference signals by UEs in RRC CONNECTED in a flexible manner allows meeting the above-noted requirements while at the same time allowing to control and limit the system overhead and latency. Specifically, performing RRM measurements based on the additional reference signal is found to be more accurate and can therefore reduce the handover latency. One reason can be that the additional reference signal is emitted from the same beam as the data transmission, and/or that the additional reference signal is transmitted over a wider spectrum.

The reference signals currently envisioned for RRC IDLE could be the same or similar to the synchronization signals or cell-specific reference signals used in LTE, as briefly discussed above, i.e., the PSS and/or the SSS. For instance, the NR IDLE reference signals could be transmitted in an omnidirectional manner, in contrast to any additional NR CONNECTED reference signals which could beamformed (like the data channels). The NR IDLE reference signals could be transmitted more sparsely compared to the NR CONNECTED reference signals. Furthermore, the NR CONNECTED reference signals could be turned on/off and/or could be configurable.

In summary, it is exemplarily assumed in the following that for 5G NR communication systems omni-directional reference signals (may also be called synchronization signals, in view of the possible implementation similar to the LTE PSS and SSS) are used for RRM measurements by UEs in the RRC IDLE state (in the following termed NR IDLE reference signals, for ease of reference). In order to obtain further benefits, it is further exemplarily assumed in the following that in NR at least one additional—beamformed—reference signal (possible similar to the LTE CSI-RS), is used for RRM measurements by UEs in the RRC CONNECTED state (in the following termed NR Connected reference signals, for ease of reference).

Moreover, in order to obtain the most benefits and comply with the design requirements for reference signals, a flexible resource allocation could be foreseen for the additional reference signal. For example, the additional reference can be switched off by a gNB; for instance, when there is no UE in RRC_CONNECTED state being served in the area served by the beam. In addition, the resources used for transmitting the additional reference signal need not be fixed but can change dynamically. This is different, e.g., from the synchronization signals (PSS, SSS) known from LTE, where the UE knows the position of the PSS and SSS within the configured frequency carrier. In order for the UEs to know where the addition NR reference signals are transmitted, it may be provided with some configuration information (e.g., time and/or frequency indications) from the network.

It should be noted that the 3GPP standardization for the new radio technology of 5G is ongoing and the terminology of the layers and entities as assumed above could be changed in the normative phase, without affecting the functioning of the embodiments of the invention.

As explained in the above paragraphs, the 5G cellular system is currently discussing how to design the reference signals in the radio cells for the UE mobility purpose in RRC Connected state and RRC Idle state. At least two different reference signals are to be used for the RRM measurement purpose in the radio cell, the NR Idle reference signal and the NR connected reference signal. The NR connected reference signal, in contrast to the NR Idle reference signal, will likely not be transmitted omni-directionally and further will not be always on (can be switched off, e.g., to save energy or reduce interference). This can however lead to the following problems.

The following scenario is assumed for explaining the problem, in connected with FIG. 8-11. A UE is currently being served by a gNB (serving gNB) and is located at the edge of serving gNB's radio cell. The UE can receive the reference signals transmitted by the serving gNB, exemplarily the NR connected reference signal (illustrated as a beam) and the NR idle reference signal (not illustrated separately, covers the radio cell).

Figure 8:
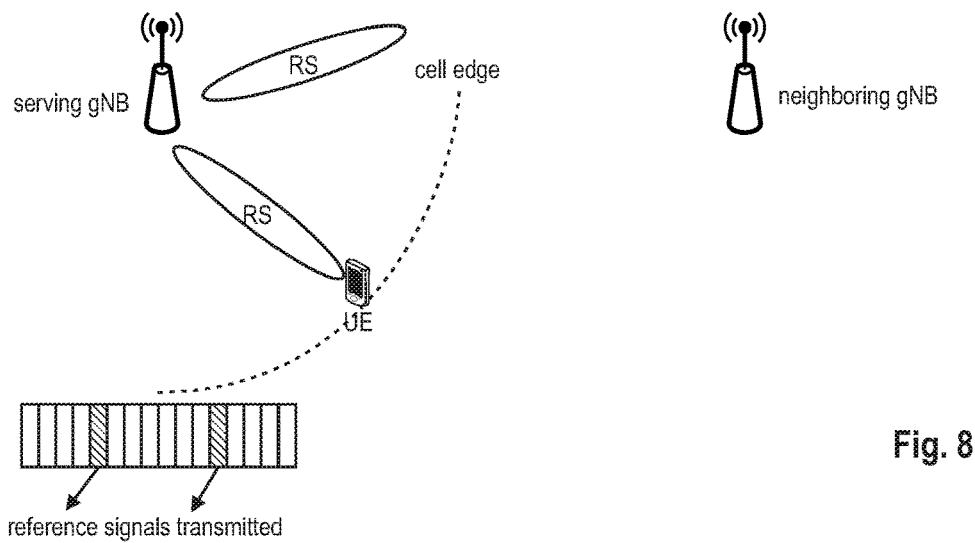
FIG. 8 illustrates a scenario to explain the underlying problem where a neighboring gNB is not transmitting a beamformed NR connected reference signal at all.

On the other hand, with reference to FIG. 8, the neighboring gNB is not transmitting the NR connected reference signal; e.g., it was switched off before to save power in view of that no UE in RRC Connected state was being served by the neighboring gNB for said beam (or corresponding data beam). Consequently, the UE is not able to receive the NR connected reference signal, and has to perform the measurements of the neighboring cell only based on the NR idle reference signal which the neighboring gNB is assumed to be transmitting always.

Figure 9:
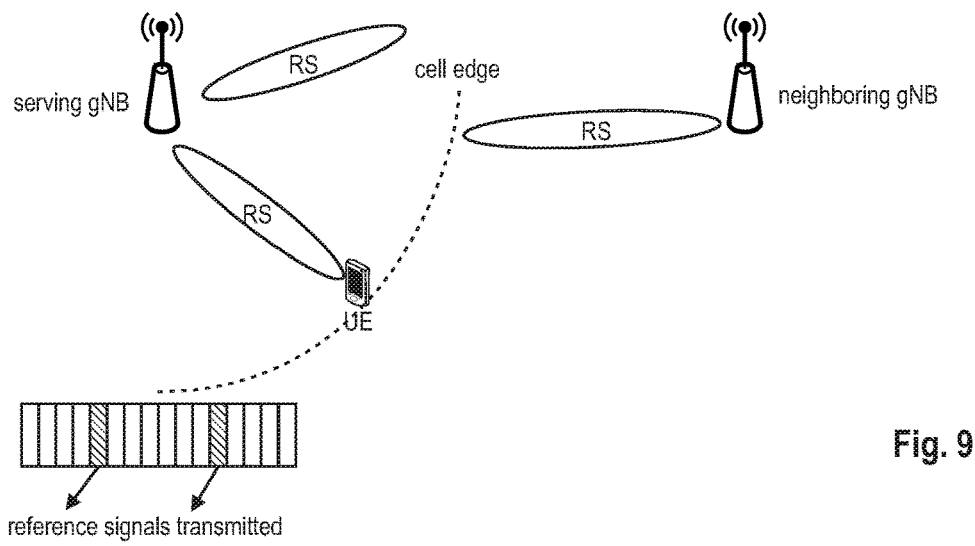
FIG. 9 illustrates a scenario to explain the underlying problem where a neighboring gNB is transmitting a beamformed NR connected reference signal in a different direction than the direction in which the UE is located.

Another problem could be that one or more NR connected reference signals are indeed being transmitted by the neighboring gNB. FIG. 9 exemplarily illustrates one beam, representing one NR connected reference signal. However, neither of the NR connected reference signal beams is directed to the UE's location, such that the UE is again not able to receive the additional reference signal to improve the measurement results performed for the neighboring cell.

Figure 10:
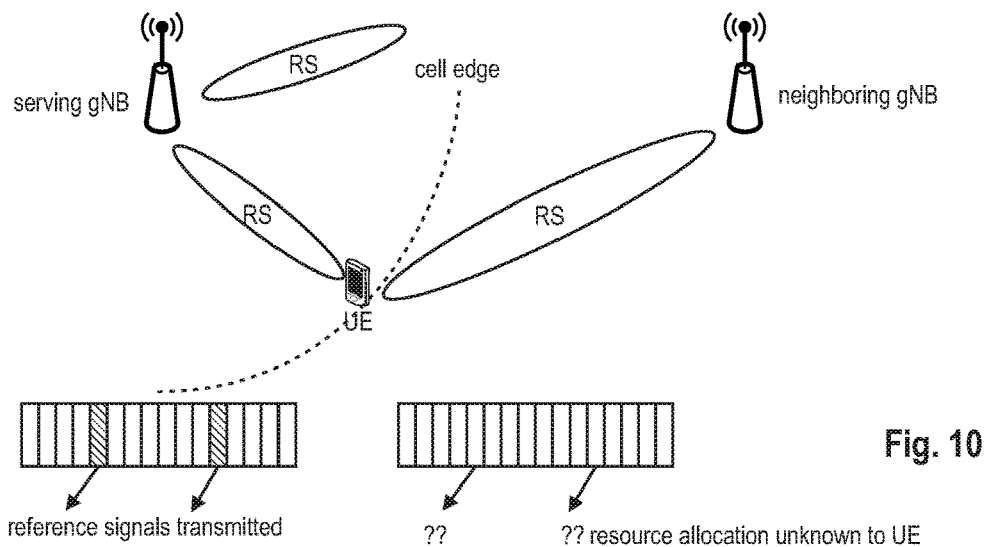
FIG. 10 illustrates a scenario to explain the underlying problem where a UE has not the necessary scheduling information on a beamformed NR connected reference signal transmitted by the neighboring gNB.

In another problematic scenario, there would be indeed an NR connected reference signal transmitted by the neighboring gNB that would reach to the UE, as illustrated in FIG. 10. However, the UE is again not able to receive the additional reference signal since it does not know the radio resources used by the neighboring gNB to transmit this additional reference signal beam. This scenario assumes that the time-frequency radio resources used for transmitted the NR connected reference signal are chosen by the neighboring gNB in a dynamic or semi-dynamic manner.

In any case, there may be many situation where a UE cannot receive the additional reference signal (NR connected reference cell) of a neighboring cell and can thus not take advantage thereof for its measurements performed for the neighboring cell, e.g., as part of a mobility (handover) procedure, as will be briefly explained in connection with FIG. 11.

Figure 11:
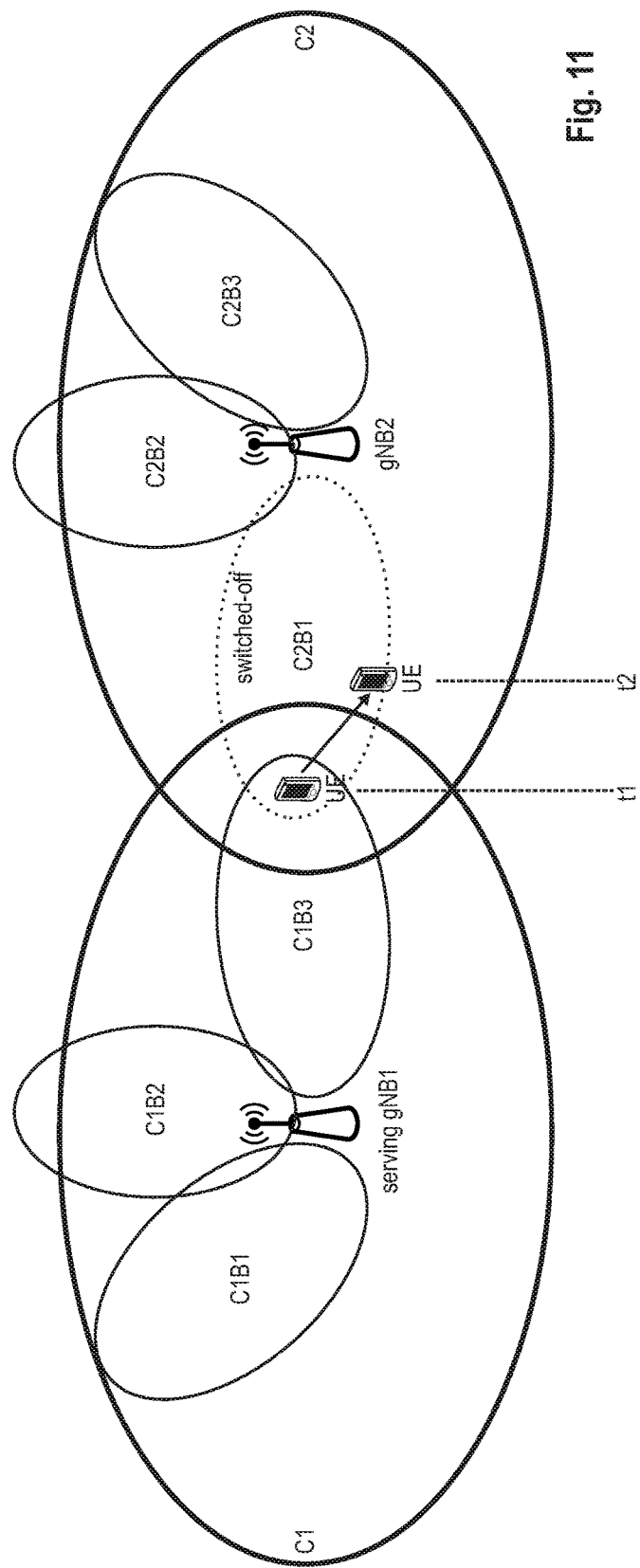
FIG. 11 illustrates a scenario to explain the underlying problem, where a handover of the UE is adversely affected by a switched-off beam of the NR connected reference signal.

In particular, FIG. 11 illustrates two radio cells of two gNBs (gNB1 and gNB2), with respective cell coverage of the NR connected reference signals (illustrated as beams C1B1, . . . C2B3) and of the NR idle reference signals (illustrated elliptically as being omni-directional). It is further assumed that beam C2B1 is switched off (dashed-line beam). The UE is located at time t1 in the overlapping area of the two radio cells, thus receiving the NR idle reference signal C1 of gNB1, the NR idle reference signal C2 of gNB2, as well as the NR connected reference signal C1B3 of gNB1. Correspondingly, the UE can perform cell measurements on both radio cells, although the measurements for the radio cell of gNB2 will only be based on the NR idle reference signal C2, since the NR connected reference signal C2B1 is switched off.

Here, it should be noted that 3GPP is considering a requirement for the mobility that gNBs (making the handover decision) shall only compare measurement results being performed based on the same type of reference signal, meaning that the serving gNB1 may not be allowed to compare the measurement performed on the C2 with the measurement performed based on C1B3. Assuming that the measurement results based only on the NR idle reference signal are less accurate, the gNB1 may not be able to make a correct handover decision.

For example, at t1 gNB1 may decide to not handover assuming that the measurement results performed by the UE respectively on C1 and C2 are substantially the same and the measurements result performed for C1B3 is higher than the non-existing measurement result for C2B1 (=0). Assuming the UE moves further in the direction of gNB2 and leaves the coverage area of gNB1, at time t2, the measurement result performed based on C2 is better (e.g., better signal quality) than the measurement result performed based on C1. On the other hand, at t2 the measurement result for C1B3 will still be higher than the measurement result for C2B 1. Thus, it is unclear how the gNB1 will make the handover decision. gNB1 may decide to trigger the handover of the UE to the radio cell of gNB2, in which case the gNB2 will switch on C2B1 (due to the presence of the UE in RRC Connected state) and will finally serve UE using the beam of C2B1 at a still later time t3. A delay in the handover is thus introduced, where the UE may also suffer from QoS degradations between t1 and t3. Conversely, if gNB1 decides to still not handover, the UE will have to eventually declare Radio Link Failure, as the signal strength from gNB1 will diminish considerably.

The present disclosure thus shall present solutions facilitating to overcome one or more of the disadvantages and/or meet one or more of the requirements mentioned above.

DETAILED DESCRIPTION OF PRESENT DISCLOSURE

In the following, UEs, base stations, and procedures will be described for the new radio access technology envisioned for the 5G mobile communication systems. Different implementations and variants will be explained as well. The following detailed disclosure was facilitated by the discussions and findings as described in the previous section "Basis of the present disclosure" and may be based at least on part thereof.

In general, it should be however noted that only few things have been actually agreed on with regard to the 5G cellular communication system such that many assumptions have to be made in the following so as to be able to explain the principles underlying the present disclosure in a clear manner. These assumptions are however to be understood as merely examples that should not limit the scope of the disclosure. A skilled person will be aware that the principles of the following disclosure and as laid out in the claims can be applied to different scenarios and in ways that are not explicitly described herein.

Moreover, terms used in the following are closely related to LTE/LTE-A systems or to terminology used in the current study items for 3GPP 5G, even though specific terminology to be used in the context of the new radio access technology for the next 3GPP 5G communication systems is not fully decided yet. Consequently, a skilled person is aware that the disclosure and its scope of protection should not be restricted to particular terms exemplary used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently-used terminology for 5G NR is gNB.

The term "omni-directional reference signal" refers to a reference signal having effectively an omni-directional coverage, which might also be achieved by using "sweeping" beams that cover different areas at different times however thus cover all the area of the radio cell after each full sweep. Omni-directional is thus to be understood, in contrast to "beamformed", in that a beam merely covers a limited (maybe narrow) non-circular area of a radio cell. Correspondingly, the term "beamformed reference signal" refers to a reference signal that is transmitted (by a gNB) in a limited (maybe narrow) non-circular area of a radio cell, thus intentionally not covering the complete radio cell coverage.

Figure 12:
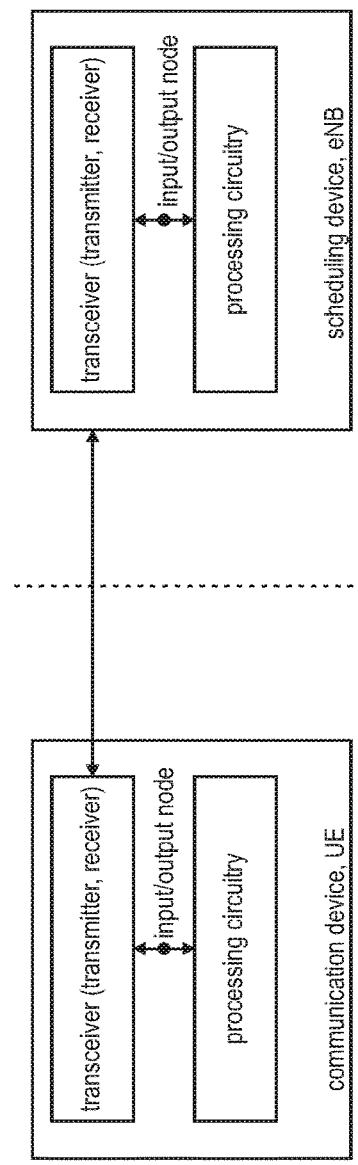
FIG. 12 illustrates the exemplary and simplified structure of a UE and an eNB.

FIG. 12 illustrates a general, simplified and exemplary block diagram of a user equipment (also termed communication device) and a scheduling device (here assumed to be located in the base station, e.g., the LTE eNB or the gNB in 5G NR). The UE and eNB/gNB are communicating with each other over a (wireless) physical channel respectively using the transceiver.

The communication device may comprise a transceiver and processing circuitry. The transceiver in turn may comprise a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver may include the RF (radio frequency) front including one or more antennas, amplifiers, RF modulator/demodulator and the like. The processing circuitry may implement control tasks such a controlling the transceiver to transmit user data and control data provided by the processing circuitry and/or receive user data and control data which is further processed by the processing circuitry. The processing circuitry may also be responsible for performing processes of determining, deciding, calculating, measuring, etc. The transmitter may be responsible for performing the process of transmitting. The receiver may be responsible for performing the process of receiving.

A simple and exemplary scenario is assumed in the following, based on previously-discussed FIG. 11, where a UE is currently connected to its serving gNB1 and moving within the corresponding radio cell, eventually reaching overlapping coverage areas of other neighboring radio cells, here gNB2. The UE is configured to perform some cell measurements, e.g., on the current radio cell of gNB1, but also—if applicable—on neighboring cells, such as the neighbor radio cell of gNB2. One exemplary option would be to re-use LTE procedures for configuring the cell measurements to be performed by the UE, as briefly explained before. Correspondingly, gNB1 might configure the UE using a Measurement Control message (e.g., as part of an RRCConnectionReconfiguration message), including different elements such as Measurement objects, Reporting Configurations, Measurement Identities, Quantity Configurations, Measurement Gaps, etc.

For example, the UE can be configured to perform the cell measurements on the NR idle reference signal and—where available—on the NR connected reference signal. In one exemplary implementation, different measurements are to be performed for each reference signal, e.g., by configuring different measurement objects.

According to one exemplary implementation, in order to receive a dynamically-allocated NR connected reference signal transmitted from gNB1, the UE can be provided with suitable information on the NR connected reference signal such that the UE is able to know where said reference signal is transmitted and how to receive same. There may be various different implementations of a dynamically-allocated NR connected reference signal. For instance, the NR connected reference signals could be dynamically transmitted on different radio resources in the frequency and time domain. On the other hand, an NR connected reference signal may be transmitted at fixed time instances or at specific frequencies known by the UE in advance. The periodicity and duration of the NR connected reference signal transmission may vary or may be fixed.

The particular implementation chosen for the dynamically-allocated NR connected reference signal determines how much information needs to be provided to the UE to enable same to receive the NR connected reference signal transmitted by the gNB1. Invariant parameters (e.g., time, frequency, periodicity, etc.) can be known to the UE from, e.g., an initial configuration by the gNB1 when the UE attaches to the cell, or from the program code of the UE (e.g., fixed by 3GPP specifications) or from other suitable mechanism. Conversely, parameters that vary dynamically may need to be provided to the UE in a timely and suitable manner.

As apparent from the exemplary scenario of FIG. 11, it is assumed that gNB1 transmits the NR idle reference signal in an omni-directional manner (C1), thereby covering substantially the whole serving radio cell area. Further, three beamformed NR connected reference signals (C1B1, C1B2, C1B3) are transmitted by gNB1 as illustrated in FIG. 11. Consequently, the UE being located in the area of beam C1B3 can perform cell measurements on the serving radio cell based on the NR idle reference signal C1 as well as on the NR connected reference signal C1B3.

Moreover, gNB2 transmits also its own NR idle reference signal in an omni-directional manner (C2), and beamformed NR connected reference signals (C2B2, C2B3). The third NR connected reference signal (C2B 1) is currently switched off and thus not transmitted by gNB2. The cell measurements performed by the UE for the neighbor radio cell of gNB2 thus only use the NR idle reference signal transmitted by gNB2 since the other beams C2B2, C2B3 are not available at the location of the UE.

The UE is configured to prepare and transmit measurement reports to the serving gNB1. Measurement reports could be triggered, e.g., on a periodical basis or based on certain preconfigured events. Some events triggering the measurements have already been presented in connection with the LTE measurement reporting procedure above. Some or all of these LTE events A1-A5, B1, B2 could be reused also for the measurement reporting procedure for 5G NR. Alternatively or in addition, other events may be defined to trigger a measurement report, e.g., in connection with the additional reference signal, NR connected reference signal. For instance, separate events could be defined for the NR connected reference signal and NR idle reference signal.

According to an improved implementation of the measurement reporting procedure, the measurement reports prepared and provided by the UE may also provide information as regards to whether the enclosed measurement results were calculated based on the NR idle reference signal and/or the NR connected reference signal. For instance, for each measurement result apart from providing the actual metric value (e.g., the RSRP value and/or the RSRQ value) and possibly the cell ID of the measured cell (e.g., the neighbor cell; may not include the cell ID for the serving cell) and possibly a corresponding measurement ID, the measurement report may provide a flag to indicate the basis of the calculation, i.e., whether the result was calculated based on the NR idle reference signal or on the NR connected reference signal. In one exemplary implementation, the measurement flag MF=0 could mean that the associated measurement result was calculated based on only the NR idle reference signal, whereas the measurement flag MF=1 would conversely mean that the associated measurement result was calculated based on the NR connected reference signal.

A different improvement of the measurement reporting procedure does not need make use of a measurement flag and thus avoids the overhead caused by said flag. Instead, the serving gNB configures the measurements to be performed by the UE such that measurements performed based on the NR idle reference signal can be distinguished from measurements performed based on the NR connected reference signal. For instance, the serving gNB defines one measurement object with a particular measurement (object) ID for measuring neighbor cell(s) based on the NR idle reference signal, while defining another measurement object with another measurement (object) ID for measuring neighbor cell(s) based on the NR connected reference signal. This could be achieved, e.g., by using a corresponding flag in the measurement control message for each (or some) measurement object, transmitted to the UE, so as to distinguish between the two measurement bases. Therefore, the UE performs the cell measurements in compliance with the instructed measurement configuration(s) and then accordingly prepares a measurement report including the results of the measurements. The measurement report can also include a measurement result ID per measurement result, such that the serving gNB1, when receiving the measurement report, identify the association between the received measurement result ID and the configured measurement object ID and can derive therefrom whether the measurement result was obtained based on the NR idle reference signal or the NR connected reference signal.

Another implementation of the improved measurement reporting procedure is that the serving gNB configures the reporting to be performed by the UE such that reporting performed based on the NR idle reference signal can be distinguished from the reporting based on the NR connected reference signal. For instance, the serving gNB defines one reporting configuration with a particular configuration ID for reporting the measurement based on the NR idle reference signal, while defining another reporting configuration with another configuration ID for reporting neighbor cell(s) based on the NR connected reference signal. This could be achieved, e.g., by using a corresponding flag in the measurement control message for each (or some) reporting configuration, transmitted to the UE, so as to distinguish between the two measurement bases. Therefore, the UE performs the measurement report in compliance with the instructed reporting configuration(s) and then accordingly prepares a measurement report including the results of the measurements. The measurement report can also include a measurement result ID per measurement result, such that the serving gNB1, when receiving the measurement report, identify the association between the received measurement result ID and the configured reporting configuration ID and can derive therefrom whether the measurement result was obtained based on the NR idle reference signal or the NR connected reference signal.

Using this improved measurement reporting procedure allows the serving gNB to distinguish the measurement basis of the measurements performed by the UE, i.e., whether the UE performed measurements based on the NR idle reference signal or the NR connected reference signal. This information may be for instance used by gNB1 to be able to compare the reference signal measurements of the same type, since this is important because making the handover decision based on the comparison on the same type of reference signal is more accurate and hence can benefit the user equipment more.

In order to improve the cell measurement procedure, different advantageous implementations of an inter-gNB coordination (here exemplary between serving gNB1 and gNB2) will be explained in the following, particularly facilitating to overcome the problems identified before. The following implementations of the inter-gNB coordination shall provide the opportunity for the UEs to receive the NR connected reference signals of neighboring cells, provided of course the neighboring cells indeed decide to support the transmission of the NR connected reference signals for the UE.

In general, the inter-gNB coordination can be initiated by the UE side, the serving gNB side and/or the neighbor gNB side, as will be separately presented in the following. First, inter-gNB coordination initiated by the serving gNB and the UE side will be explained, as they share most of the processes, in contrast to the neighbor-gNB-initiated inter-gNB coordination.

The serving gNB will at some point determine that the user equipment is not being provided with the NR connected reference signal off the neighbor cell, which can be detrimental for the measurement accuracy and which can lead to one or more of the problems already discussed above. Moreover, the fact that the neighbor gNB is not transmitting the NR connected reference signal in the area where the UE is located might also be an indication that the neighbor gNB has already a high load (thus trying to save energy where possible) and might not be interested in or capable of providing (data) coverage for another UE.

Having identified this potential source of problems, the serving gNB may decide to request the neighbor gNB to provide the missing NR connected reference signal to the UE. Correspondingly, the serving gNB will transmit a reference signal request to the neighbor gNB, requesting to provide the NR connected reference signal to the UE. This request message may for instance include a cell identification of the neighbor cell of the neighbor gNB. In addition, this request message may optionally also include mobility information of the user equipment, so as to allow the neighbor gNB to identify the position of the UE. There are various implementations on what this mobility information (could also be termed location information) contains. In one implementation the location of the UE is presented by its GPS (Global Positioning System) coordinates, which can be obtained from the UE.

Another implementation for the UE location information makes use of the LTE positioning protocol (LPP), which allows the gNB1 to determine the position of a UE. The gNB1 can thus also obtain the GPS coordinates using the LPP protocol, e.g., from an Evolved-Serving Mobile Location Center which is in connection with the UE. A detailed definition of the LPP can be found in the 3GPP TS 36.355 specification, latest version being 14.1.0, section 5 "LPP Procedures", incorporated herein by reference and 3GPP TS 36.455 v14.1.0, incorporated herein by reference.

Another implementation of the UE's location information in the reference signal request message is based on the measurement results provided by the UE. In particular, the serving gNB can estimate from the measurements results where the UE is located. For instance, this can be done by comparing the measurement results performed by the UE for several cells, thus determining relative RSRP information. Although less accurate than the GPS coordinates, such location information could suffice to allow the neighbor UE to decide whether to provide the requested NR connected reference signal to the UE.

In a still further implementation of the UE's location information in the reference signal request message, the gNB may simply include the measurement report (part of it, or completely) into the reference signal request message. Then, the neighbor gNB—if necessary or interested—may have to derive the location of the UE from the measurement results in the same or similar manner as just explained in detail for gNB1 for the previous implementation.

The following table shows an exemplary implementation of the reference signal request message.

| Element Name | Presence | Description |
| --- | --- | --- |
| The Cells to be Negotiated with | | The neighboring cells to be negotiated with |
| >Cell ID | Mandatory | |
| Mobility Information of the UE | Optional | The mobility information of the UE can be: measurement report from UE, or the relative RSRP information retrieved from the measurement report, or location information from LPP |

The neighbor gNB in turn, after receiving the reference signal request message from the serving gNB of the UE, may decide whether or not to provide the NR connected reference signal to the UE. This decision by the neighbor gNB may take into account various different considerations. For instance, the neighbor gNB may be already serving too many UEs or may already be limited in the power output, such that in either case it may decide against providing the NR connected reference signal to the UE (and later would have to reject anyway the possible handover request from the serving gNB). On the other hand, the neighbor gNB may also take into account the location information of the UE when determining whether or not to provide the NR connected reference signal to the UE. For instance, it can be exemplarily assumed that the NR connected reference signal is already being transmitted by the neighbor gNB2, although in another direction than the direction in which the UE is located. In said case, instead of transmitting an additional beam for the NR connected reference signal, it may be sufficient to merely change the direction of the already available beam of the NR connected reference signal so as to allow the NR connected reference signal to reach the UE's location. In said case, the neighbor gNB may decide to provide the NR connected reference signal to the UE since no extra power has to be expended; the change of direction of the beam may even be limited to a particular duration of time.

According to another scenario, the neighbor gNB might also take into account the interference that would be caused in the radio cell by transmitting one or more beams for the NR connected reference signal.

As just explained, the neighbor gNB will be able to make a decision as to whether or not it should provide the NR connected reference signal to the UE. In any case however, the neighbor gNB may respond to the received reference signal request to the serving gNB1, by providing suitable information on the transmission of the requested NR connected reference signal. The content of this reference signal request response message will depend on the outcome of the decision to provide or not provide the NR connected reference signal to the UE.

In case the neighbor gNB2 decides against providing the NR connected reference signal to the UE, the response message will have to merely include a corresponding information element on the rejection of the request. Optionally, the serving gNB may then inform the UE about this rejection, such that the UE shall continue to perform the measurements only on the basis of the NR idle reference signal and may thus skip trying to perform the measurements on the unavailable NR connected reference signal. Furthermore, the UE might then know no longer initiate the inter-gNB coordination, since it was already rejected. Optionally, the UE might even stop measuring the NR connected reference signal of the serving cell, in case no other neighboring cell are transmitted the NR connected reference signal, since no meaningful comparison of the measurements can be made.

The response message may include the cell ID of the neighbor cell such that the serving gNB is able to determine to which radio cell (and to which request) the response refers.

On the other hand, in case the neighbor gNB2 decides in favor of providing the NR connected reference signal to the UE, the reference signal response message may include the confirmation of the request and—if necessary or advantageous—may include further information relating to the requested NR connected reference signal.

For instance, the reference request response may include scheduling information for the NR connected reference signal, so as to be forwarded to the UE such that the UE is able to receive the NR connected reference signal. The scheduling information may indicate the radio resources in the frequency and/or time domain that will be used by the neighbor gNB2 to transmit the requested NR connected reference signal. On the other hand, all or part of the scheduling information may not be necessarily included in the reference request response message. For instance, the frequency(ies) and/or the timing of the radio resources may be fixed in the 3GPP standard or may already be known to the UE or gNB1 from previous information exchanges, making the need for a further exchange of the scheduling information obsolete. In response to a previous reference signal request message for the same or another UE, the gNB2 may have already provided the scheduling information of the requested NR connected reference signal to the gNB1. The presence of the scheduling information in the reference signal response message is thus optional.

Moreover, according to further exemplary implementations, the gNB2, even though deciding to provide the NR connected reference signal as requested to the UE, may further decide to limit the duration of time the NR connected reference signal is provided to the UE. This may be done in order to be able to again save energy and/or to reduce interference, while at the same time still providing the UE with the opportunity to perform accurate measurements of the neighbor cell. After the duration of time elapses, the neighbor gNB can either switch off the beamformed NR connected reference signal, or change back its direction. In said case, gNB2 may or may not include corresponding duration information into the reference signal request response message, this duration information then allowing the gNB1 and the UE (after being forwarded to same) to learn during which time the enhanced measurements can be performed, using the NR connected reference signal.

The gNB2 may in addition or alternatively decide to transmit the NR connected reference signal to the UE with a specific periodicity, instead of transmitting same all the time. Again, this may be beneficial for the gNB2, e.g., to save energy and/or to reduce interference. In said case, gNB2 may or may not include corresponding periodicity information in the reference signal request response message, which would then allow gNB1 and the UE (after being forwarded to same) to learn at which periodicity the NR connected reference signal is transmitted by gNB2.

The following table illustrates a particular exemplary implementation of this reference signal request response message.

| Element Name | Presence | Description |
| --- | --- | --- |
| The List of Cells Responding to the Request | | The cells of the neighboring gNB in which the NR connected reference signal has been turned on (or is on) |
| >Cell ID | Mandatory | |
| >List of TRPs | | The TRPs in which the NR connected reference signal has been turned on (or is on) |
| >>TRP Index Number | Mandatory | |
| >>Scheduling Info | Optional | The scheduling information for the NR connected reference signal in both the time and frequency domain |
| >>Duration | Optional | The duration during which the TRP will keep transmitting the NR connected reference signal |
| >>Periodicity | Optional | The periodicity of the NR connected reference signal |

The TRP mentioned above, refers to a Transmission Reception Point and is used in the technical field to circumscribe a beam (or beamformed transmission). Consequently, the above exemplary response signal includes a list of beams transmitted in the neighbor cell by gNB2 (identified by the associated cell ID), respectively including a beam index number as a mandatory information element, and including scheduling information, duration information and periodicity information as an optional information elements.

As explained above, the gNB2, when deciding to provide the NR connected reference signal to the UE, may decide either to establish a new beam to transmit the NR connected reference signal to the UE, or to change the direction and/or transmission power of another beam with which the NR connected reference signal is already being transmitted so as to be able to reach the UE.

The serving gNB1 will be informed accordingly using a reference signal request response message as discussed above. Subsequently, the serving gNB1 may inform the UE by transmitting a notification message to the UE, comprising information with regard to the requested NR connected reference signal. The content of this notification message can vary substantially based on the implementation and assumed scenario. The transmission of the notification message might not even be necessary for scenarios in which the UE, without further information, is able to receive the requested NR connected reference signal, after same has been made available by the neighbor gNB (e.g., switched on or an already available beam of the NR connected reference signal has been redirected towards the UE).

On the other hand, the notification message may include necessary scheduling information (in the frequency and/or time domain), and/or duration information, and/or periodicity information, all of which may be necessary for the UE to be able to properly receive and process the requested NR connected reference signal.

One exemplary implementation of this notification message transmitted from the serving gNB to the UE is the RRCConnectionReconfiguration message used by the serving base station to provide a new measurement configuration to the UE, possibly including necessary information on the requested NR connected reference signal. For instance, a new measurement object can be defined for the new NR connected reference signal, or a previously defined measurement object can be adapted accordingly. The new or adapted measurement object may then indicate how to conduct the measurements involving the NR connected reference signal.

Alternatively, the notification message could also be implemented in the form of a MAC control element or a control signal of the PHY layer.

In any case, the UE shall be able to receive the requested NR connected reference signal. Accordingly, the UE will perform the cell measurements on the neighbor cell using this NR connected reference signal, thus improving the accuracy of the measurement results then provided to the serving radio base station in a measurement report, which may then be used by gNB2 for instance in order to make a decision on whether or not to handover the UE to the neighboring cell. The problems during the handover procedure explained above in connection with FIG. 11 will thus be mitigated in view of the availability of improved measurements on the NR connected reference signal.

This improved inter-gNB coordination according to one of the various implementations explained above allows mitigating the problems arising from the use of the NR connected reference signal. The NR connected reference signal has specific characteristics, such as its limited coverage area (in the form of a beam), it is not always on (since it can be switched off), and it can be dynamically or semi dynamically scheduled (e.g., radio resources in frequency and or time may change). These specific characteristics of this additional reference signal for UEs in the RRC connected state provide various advantages as explained above, such as increased flexibility, energy saving possibilities, interference mitigation possibilities, etc. By using the improved inter-gNB coordination, these advantages of using an NR connected reference signal with such characteristics can be maintained, while at the same time allowing UEs to take full advantage of the NR connected reference signal to improve measurement accuracy.

In the above, it was briefly explained that the serving gNB will at some point determine that the user equipment is not being provided by the neighbor cell with the NR connected reference signal, which can be detrimental for the measurement accuracy and which can lead to one or more of the problems already discussed above. As will be explained in the following, conceptually there are at least two different solutions on how the serving gNB determines that the user equipment is not being provided with the NR connected reference signal. According to one solution, this determination is done by gNB1 based on the measurement reports received from the UE (serving-gNB-initiated inter-gNB coordination). According to the second solution, the UE will first determine that it is not receiving the NR connected reference signal and will thus initiate the inter-gNB coordination itself by triggering the gNB1 as will be explained in the following (UE-initiated inter-gNB coordination).

As regards the serving-gNB-initiated inter-eNodeB coordination, the serving gNB is receiving measurement reports from the UE as explained above, e.g., using the improved measurement report format. The serving gNB will then analyze the content of the measurement report, specifically the result of the measurements performed by the UE for the neighboring cell. As explained above, the improved measurement report may include information (such as the flag or measurement ID) from which the serving gNB can distinguish which measurements have been performed on the NR idle reference signal and which measurements have been performed on the NR connected reference signal. For instance, if the serving gNB determines that the UE performed measurements for the neighbor cell only based on the NR idle reference signal, but not based on the NR connected reference signal, it may decide to initiate the inter-gNB coordination in order to request the neighboring cell to also provide the NR connected reference signal to the UE.

More specific exemplary implementations define one or more particular events which could trigger the serving gNB to initiate the inter-gNB coordination as explained above. For instance, one event could be that the UE did not report a measurement of the NR connected reference signal of a specific neighbor cell for a long time. Another event could be that the UE did not report a measurement of the NR connected reference signal of a specific neighbor cell, and the link quality between the UE and the serving gNB becomes worse than a specific threshold. Another exemplary event could be that the UE did not report a measurement of the NR connected reference signal of a specific neighbor cell, and the UE mobility (e.g., the moving speed) goes beyond a certain threshold.

As regards the UE-initiated inter-gNB coordination, the UE determines that it does not receive the NR connected reference signal of a neighbor cell and thus decides to initiate the inter-gNB coordination in order to request the neighbor gNB to provide the NR connected reference signal to the UE. For instance, the UE receives the NR idle reference signal and thus knows that it is within coverage of a neighboring radio cell, however also notices that it does not receive a corresponding NR connected reference signal for this neighboring radio cell. If the UE wants to improve the measurement accuracy based on the NR connected reference signal, it may decide to transmit a corresponding UE-initiated reference signal request to its serving gNB, which may indicate the radio cell or radio cells for which the UE would like to also receive the NR connected reference signal. In turn, the serving gNB, upon receiving the request from the UE, can decide whether or not to forward the request further to the neighbor gNB for which the request is intended. For instance, the serving gNB might already know that the neighbor gNB will not be able to serve another UE, or might know that the neighbor base station is actually an eNB not an gNB. In both cases, the serving gNB might decide to not agree with the UE's request.

It is exemplary assumed that the serving gNB agrees with the UE's request to request the neighbor gNB to provide the NR connected reference signal, and thus that the serving gNB transmits a reference signal request to the neighbor cell as explained in detail before.

To summarize the above, the inter-gNB coordination can either be initiated by the UE or the serving gNB. Corresponding exemplary and simplified implementations of such solutions are respectively illustrated in FIGS. 13 and 14 and will be explained as an overview below.

Figure 13:
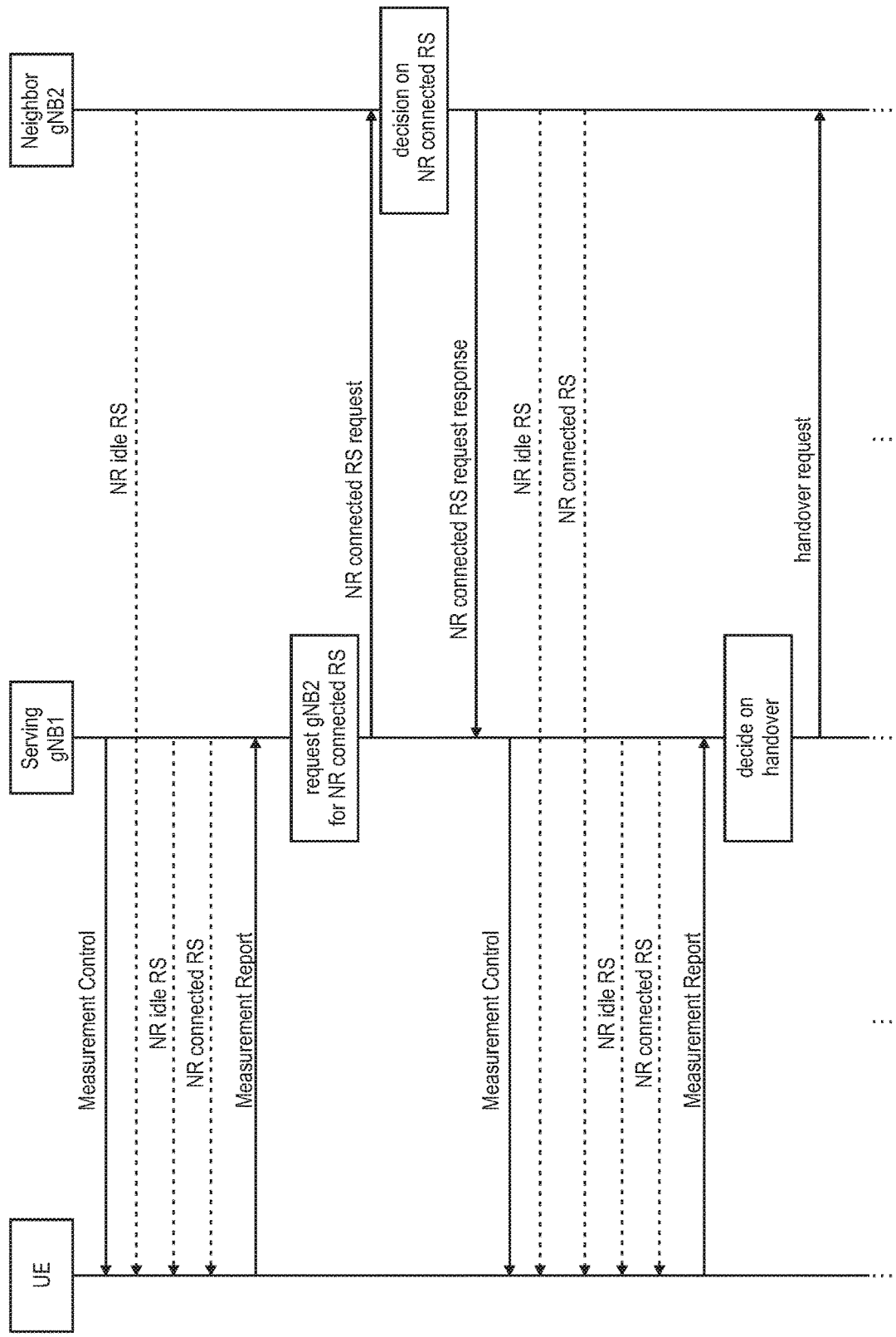
FIG. 13 illustrates a signaling diagram for an improved inter-gNB coordination procedure initiated by a serving gNB serving a UE.

FIG. 13, which illustrates the message exchange between the UE, gNB1 and gNB2, relates to the inter-gNB coordination initiated by the serving gNB (see box "request gNB2 for NR connected RS"). As illustrated in FIG. 13, it is exemplarily assumed that the UE is initially configured to provide measurements (see arrow "Measurement Control"). In compliance with the scenario assumed for FIG. 11, it is assumed that the serving gNB1 transmits the NR idle reference signal as well as the NR connected reference signal, both of which are received by the UE (see dashed arrows). In contrast, the neighbor gNB2 transmits the NR idle reference signal (see dashed arrow), but not an NR connected reference signal to the UE. In accordance with the initially configured measurement configurations, the UE will eventually provide a measurement report to the serving gNB1, from which the serving gNB1 can determine that the NR connected reference signal of the neighbor gNB2 is not received by the UE (see above for details). The serving gNB1 may thus decide to request the neighbor gNB2 to provide the NR connected reference signal to the UE, by transmitting a corresponding request (see arrow "NR connected RS request"). The neighbor gNB2 can then decide whether or not to provide the NR connected reference signal to the UE. A corresponding response message, in compliance with the decision taken by the gNB2, is then transmitted by the gNB2 back to the gNB1. In FIG. 13 it is further assumed that the neighbor gNB2 indeed accepts to provide the NR connected reference signal to the UE and accordingly transmits same to the UE, as illustrated by the dashed arrow. The serving gNB1 can inform the UE on the result of the request, by e.g., transmitting a further Measurement Control message (e.g., to provide scheduling information of the NR connected reference signal).

The UE can then proceed to perform the cell measurements also based on the newly provided NR connected reference signal and provide the measurement results to the serving gNB1 in a measurement report. The measurement results can then be used by the serving gNB1 to decide whether to hand over the UE to the neighboring cell, in which case a corresponding handover request can be transmitted to the neighboring gNB2 in a suitable manner (e.g., as known from LTE). FIG. 13 ends with the transmission of the handover request message, since further steps are of less relevance to the ideas and implementations presented in this application. The procedure may, e.g., continue in compliance with the typical handover procedure in LTE as described with reference to FIG. 5.

Figure 14:
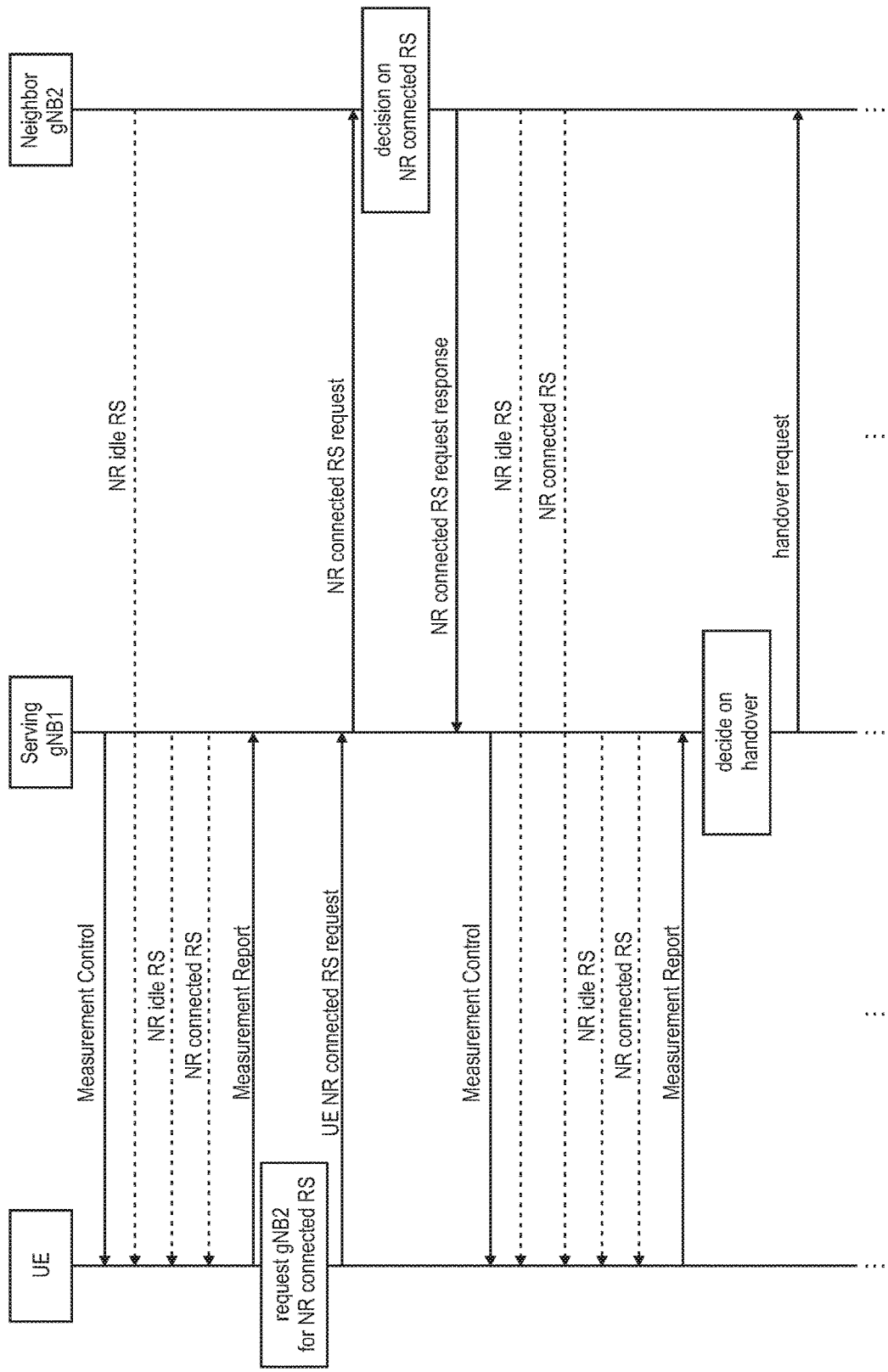
FIG. 14 illustrates a signaling diagram for an improved inter-gNB coordination procedure initiated by a UE.

FIG. 14 on the other hand relates to the inter-gNB coordination initiated by the UE and coincides in large parts with the implementation discussed above in connection with FIG. 13. As can be appreciated from comparing FIG. 13 and FIG. 14, the main difference is that the UE (not the serving gNB1) at some point decides to request the gNB2 to provide the NR connected reference signal to the UE (see box "request gNB2 for NR connected RS") and thus transmits the UE-initiated NR connected reference signal request (see arrow "UE NR connected RS request") to the serving gNB1. In turn, as exemplary assumed in FIG. 14, the serving gNB1 decides to follow the UE's request and transmits the NR connected reference signal request to the neighbor gNB2. The remaining steps in FIG. 14 can be the same or similar to the ones explained above in connection with FIG. 13.

This UE-initiated reference signal request of FIG. 14 can be implemented in various ways, and in a basic exemplary solution may simply comprise the cell ID of the neighbor cell (e.g., obtained from the NR idle reference signal) so as to identify the cell from which the UE would like to receive the NR connected reference signal. Moreover, the UE-initiated reference signal request may also include various cell IDs, in case the UE would like to request the transmission of NR connected reference signals from various neighboring cells.

In exemplary solutions, the UE may use a MAC Control Element as the UE-initiated reference signal request message. A specific LCID value (e.g., one of the non-reserved LCID values, e.g., 01100), known to both the UE and gNB1, identifies the MAC Control Element as the UE-initiated reference signal request. As already mentioned for the basic solution, the MAC control element may comprise information that allows the gNB1 to identify the one or more cells for which the reference signal request is meant. One solution for the cell identification could be to directly carry the cell ID(s) within the MAC Control Element, which however might increase the size of the MAC Control Element substantially especially for cases where the reference signal request refers to several radio cells.

Another solution for the cell identification could be to provide a bitmap of cells, which in combination with the measurement report, allows the gNB1 to identify the radio cells for which the request is meant. The size of the MAC Control Element can thus be reduced considerably. In particular, a bitmap of, e.g., 7 bits is provided in the MAC Control Element, where each bit of the bitmap is associated with a particular measurement result in the measurement report. The measurement report in turn comprises for the measurement results for a neighbor cell also the cell ID of those neighbor cells, such that the bitmap identifies measurement results (and thus radio cells and their IDs) for which the UE requests the transmission of the NR connected reference signal. The UE has to take care that the cell bitmap in the MAC Control Element correctly points to those measurement results in the measurement report that are associated with the radio cells for which the UE is requesting the transmission of the NR connected reference signal.

An exemplary MAC Control Element is illustrated in FIG. 15, which illustrates in the second octet a cell bitmap of 7 bits C1-C7, which can be used to indicate (by setting the respective bit to, e.g., 1) to which of the neighbor cells for which measurement results are included in the measurement report the reference signal request should be transmitted.

In other exemplary solutions, the UE may use a PDCP Control PDU as the UE-initiated reference signal request message. A specific PDU type value (one of the non-reserved PDU type values, e.g., 100), known to both the UE and gNB1, identifies the PDCP control PDU as the UE-initiated reference signal request message. As discussed in detail for the MAC Control Element solution, the PDCP Control PDU may comprise information that allows the gNB1 to identify the one or more cells for which the reference signal request is meant. The two solutions discussed in detail above for the cell identification in the MAC control element can be equally applied to the PDCP control PDU.

An exemplary PDCP Control PDU is illustrated in FIG. 16. As already explained in connection with FIG. 15, a cell bitmap of 7 bits C1-C7 is exemplarily assumed for the purpose of identifying the radio cells for which the UE is requesting the additional transmission of the NR connected reference signal.

As mentioned above, instead of being initiated by either the serving gNB or the UE, the inter-gNB coordination can also be initiated via the neighbor gNB (here for instance gNB2). In said case, the neighbor gNB2 will inform the serving gNB1 serving the UE (and possibly other neighboring gNBs) about the transmission of the NR connected reference signal in the radio cell of gNB2. This may include informing the other gNBs about the scheduling information, e.g., the radio resources in the frequency domain and time domain, which will be used by gNB2 to transmit the NR connected reference signal. This scheduling information may be necessary to enable UEs to receive the NR connected reference signal from the gNB2.

As explained before with regard to previous implementations, other information may also be necessary for a UE to properly receive and process the NR connected reference signal. For instance, the transmission of the reference signal might be restricted to a particular duration in time or might be performed with a specific periodicity. Correspondingly, duration information and/or periodicity information may also be provided to neighboring gNBs in addition to the scheduling information.

Even after providing the scheduling information (and possibly other information) to other gNBs, the gNB2 may still decide whether or not to maintain the one or more beams with which the NR connected reference signal is transmitted. As already explained for previous solutions, gNB2 might decide to switch off certain beams in order to save energy and/or reduce interference in its radio cell; particularly in case that no UE in RRC connected state is located within the coverage area of said beam(s). Alternatively, the gNB2 might also decide to change the direction and/or the transmission power of certain beams, e.g., so as to (temporarily) provide the NR connected reference signal in a different coverage area. Conversely, gNB2 can at some point in time also decide to switch on certain deactivated beams of the NR connected reference signal.

In one exemplary implementation, so as to keep neighboring gNBs updated on the status (e.g., switched off, switched on, changed direction, etc.) of the beams with which the NR connected reference signal is transmitted by gNB2, the gNB2 may decide to transmit further notification messages to the neighboring gNBs. These subsequent notification messages could be similar to the first notification message as explained above. In another exemplary implementation, the subsequent notification messages can be simplified by merely identifying the one or more beams which status has changed (e.g., which have now been switched off or on, or have been redirected). To said end, the various beams with which the NR connected reference signal is transmitted are associated respectively with a beam index, uniquely identifying the beam transmitted by gNB2. The beam index can already be transmitted to the other gNBs together with the scheduling information in the first notification message of the inter-gNB coordination. Then, subsequent notifications may merely include the beam index or indexes of those beams which activation status is changed, such that the receiving neighboring gNBs may derive which beams (with the corresponding scheduling information) are no longer transmitted (or are again available) from gNB2.

FIG. 17 illustrates an exemplary message exchange for an inter-gNB coordination initiated by the neighboring gNB2. As illustrated, it is assumed that gNB2 decides to inform other neighbor gNBs about the transmission of the NR connected reference signal. This may be done, e.g., upon starting the transmission of the NR connected reference signal for the first time. Correspondingly, gNB2 transmits a reference signal notification message to one or more neighboring gNBs (here exemplarily to gNB1). The reference signal notification message may correspond to the one as explained above, and may thus include the cell ID and optionally scheduling information about the NR connected reference signal.

The neighboring gNBs, receiving the notification message from gNB2, can optionally acknowledge the receipt of the notification message by transmitting an acknowledgment message back to gNB2, as exemplarily illustrated in FIG. 17.

The procedure illustrated in FIG. 17 may then exemplarily continue with transmitting a measurement control message to the UE, e.g., so as to provide the UE with information about the NR connected reference signal of gNB2. This measurement control message transmitted to the UE may however not be necessary, e.g., in case the UE is not in the vicinity of the gNB2 or in case the UE does not have the capability of measuring the NR connected reference signal anyway.

FIG. 17 also illustrates the process of switching off the NR connected reference signal (or at least one beam thereof), which can trigger the transmission of another reference signal notification message, so as to inform one or more of the neighboring gNBs about the switched-off reference signal. As explained above, in one exemplary implementation this subsequent notification may need to only include a beam index, identifying the beam that has been switched off. FIG. 17 assumes exemplarily that the UE is not informed about the switched off beam, e.g., because it is not relevant at that time.

The following table illustrates the content of an exemplary NR connected reference signal notification message transmitted by gNB2 to other neighboring gNBs.

| Element Name | Presence | Description |
| --- | --- | --- |
| The List of Cells | | The cells in which the NR connected reference signal has been configured |
| >Cell ID | Mandatory | |
| >List of TRPs | | The list of TRPs in which the NR connected reference signal has been configured |
| >>TRP Index Number | Mandatory | |
| >>Scheduling Info | Optional | The scheduling information for the NR connected reference signal in both the time and frequency domain |
| >>Periodicity | Optional | The periodicity of the additional RS |

As apparent therefrom, it is assumed that the message as a mandatory element comprises the cell ID of gNB2, and further comprises a list of beams. For each beam, a beam index (TRP Index Number) is provided mandatorily and scheduling information and periodicity information are provided as optional information elements.

As explained for previous solutions, the NR connected reference signal might be scheduled dynamically, i.e., with changing radio resources. This would be however detrimental in the sense that the inter-gNB coordination as initiated by the neighbor gNB would have to be advantageously triggered each time the scheduling is dynamically adapted. Consequently, the inter-gNB coordination initiated by the neighbor gNB as explained above might be particularly advantageous for cases where the scheduling information for the NR connected reference signal does not change often, such that the initially transmitted scheduling information remains valid for a long time.

Since the neighboring cells may be kept updated with the valid scheduling information, the serving gNB1 is aware of the beams for the NR connected reference signal being transmitted by the gNB2 and can thus configure the measurements to be performed by the UE accordingly in advance and in a fast manner. In said respect, the serving gNB1 can transmit a measurement control message to the UE, e.g., when the UE is close to the gNB2, and/or at an earlier point in time taking also into account whether the UE's maximum number of measurement configurations has not been reached.

As explained several times before, the UE will then perform the cell measurements in compliance with the measurement controlled configurations and will correspondingly transmit measurement reports to its serving gNB. The results of the measurement reports can then be used for instance by the serving gNB to decide on whether to hand over the UE to the neighboring cell. As exemplary illustrated in FIG. 17, the serving gNB1 can initiate the handover by transmitting the handover request to the neighboring gNB2.

Several different solutions have been explained above for an improved inter-gNB coordination, specifically being conceptually different as to which entity initiates the inter-gNB coordination. Although these different solutions have been described separately from one another, it should be noted that these can be also applied in parallel, i.e., in combination so as to obtain the most benefits of the respective solutions.

For instance, the inter-gNB coordination initiated by the neighbor gNB can be applied to inform other gNBs in advance. In addition, exemplarily assuming that the NR connected reference signal of gNB2 is not received by the UE, the UE-initiated inter-gNB coordination or serving-gNB-initiated inter-gNB coordination can be used to request the transmission of an NR connected reference signal from gNB2. In response to the request, gNB2 may then decide to switch on a beam to provide the NR connected reference signal to the UE or to appropriately change the direction of another beam already providing the NR connected reference signal. In view of that the necessary scheduling information is already known to gNB1 because of the previously-performed neighbor-gNB-initiated inter-gNB coordination, the gNB2 does not need to again provide such information in the response to the serving gNB. Furthermore, it might not be necessary anymore to properly configure the UE for the measurements, in case the serving gNB had already provided corresponding measurement configuration information during the neighbor-gNB-initiated inter-gNB coordination.

Similarly, the inter-gNB coordination might be initiated by the UE or the serving gNB in parallel.

Further Aspects

According to a first aspect, a radio base station, serving a user equipment in a first radio cell of a mobile communication system is provided. The radio base station comprises processing circuitry which determines that a neighbor radio base station does not provide a beamformed reference signal to the user equipment. The neighbor radio base station controls the transmission in its neighbor radio cell of an omni-directional reference signal and the beamformed reference signal. A transmitter of the radio base station transmits a reference signal request to the neighbor radio base station. The reference signal request requests the neighbor radio base station to provide the beamformed reference signal to the user equipment. A receiver of the radio base station receives from the neighbor radio base station a reference signal request response, including information on the transmission of the requested beamformed reference signal. The transmitter transmits a notification message to the user equipment, comprising information on the requested beamformed reference signal.

According to a second aspect provided in addition to the first aspect, the reference signal request response informs that the neighbor radio base station will not provide the requested beamformed reference signal to the user equipment. In one optional implementation, the notification message transmitted to the user equipment informs on that the requested beamformed reference signal will not be provided to the user equipment.

According to a third aspect which is provided in addition to the first or second aspect, the reference signal request response informs that the neighbor radio base station will provide the requested beamformed reference signal to the user equipment. In an optional implementation, the reference signal request response further includes scheduling information for the requested beamformed reference signal. In an optional implementation, the scheduling information identifies radio resources in a frequency domain and/or a time domain. In an optional implementation, the notification message transmitted to the user equipment comprises scheduling information for the requested beamformed reference signal such that the user equipment can receive the requested beamformed reference signal.

According to a fourth aspect provided in addition to one of the first to third aspects, the reference signal request includes information to derive the position of the user equipment. In an optional implementation, this information to derive the position includes global positioning system coordinates or relative measurement results calculated from the measurement report received from the user equipment or the measurement report received from the user equipment. In an optional implementation, the reference signal request further includes identification information of the neighbor radio cell.

According to a fifth aspect provided in addition to one of the first to fourth aspects, the reference signal request response includes a list of beams with which the requested beamformed reference signal will be transmitted. In an optional implementation, for each beam in the list the reference signal request response includes:
  duration information about the duration of time the requested beamformed reference signal will be transmitted by the neighbor radio base station; and/or
  periodicity information about the periodicity in time with which the requested beamformed reference signal will be transmitted by the neighbor radio base station.

According to a sixth aspect provided in addition to one of the first to fifth aspects, the receiver receives from the user equipment a measurement report, including one or more results of measurements performed by the user equipment at least on the neighbor radio cell. The processing circuitry determines that the neighbor radio base station does not provide the beamformed reference signal to the user equipment based on the received measurement report and determines to transmit the reference signal request to the neighbor radio base station, in case the one or more measurement results on the neighbor radio cell comprise results of measurements performed by the user equipment based on the omni-directional reference signal but do not comprise results of measurements performed by the user equipment based on the requested beamformed reference signal. In an optional implementation, a measurement result is associated with a flag in the measurement report indicating whether the associated measurement result was calculated based on the omni-directional reference signal and/or the beamformed reference signal, and/or wherein a measurement result is associated with a measurement identification based on which the processing circuitry, when in operation, determines whether the associated measurement result was calculated based on the omni-directional reference signal and/or the beamformed reference signal.

According to a seventh aspect provided in addition to one of the first to sixth aspects, the receiver receives from the user equipment a user-equipment-initiated reference signal request requesting the beamformed reference signal to be provided by the neighbor radio base station. The processing circuitry determines that the neighbor radio base station does not provide a beamformed reference signal to the user equipment based on the received user-equipment-initiated reference signal request. The processing circuitry determines to transmit the reference signal request to the neighbor radio base station, based on the received user-equipment-initiated reference signal request.

According to an eighth aspect provided in addition to the seventh aspect, the user-equipment-initiated reference signal request includes information to identify the neighbor radio cell and optionally includes information to identify at least a further radio cell for which a corresponding beamformed reference signal is requested. In an optional implementation, the user-equipment-initiated reference signal request is a Medium Access Control, MAC, Control Element, comprising a predetermined logical channel identifier identifying the MAC Control Element to be the user-equipment-initiated reference signal request. Alternatively, the user-equipment-initiated reference signal request is a Packet Data Convergence Protocol, Control Packet Data Unit, a PDCP Control PDU, comprising a predetermined type identifier identifying the PDCP Control PDU to be the user-equipment-initiated reference signal request.

According to a ninth aspect provided in addition to one of the first to the eighth aspects, the omni-directional reference signal is achieved by transmitting same in all directions at substantially the same time and/or by transmitting same in form of a beam which direction is successively changed in time so as to be thus transmitted in all directions.

According to a tenth aspect provided in addition to one of the first to ninth aspects, the radio base station controls transmission of a second omni-directional reference signal in the first radio cell and transmission of a second beamformed reference signal in the first radio cell. The receiver receives a second reference signal request from another radio base station requesting to provide the second beamformed reference signal to another user equipment. The processing circuitry determines whether or not to provide the second beamformed reference signal to the other user equipment. In case of providing the second beamformed reference signal to the other user equipment, the radio base station at least performs one of the following:
  switching on the transmission of the second beamformed reference signal, and/or changing the direction and/or the transmission power of the second beamformed reference signal such that the other user equipment is able to receive the second beamformed reference signal; and
  transmitting scheduling information to the other radio base station for the requested second beamformed reference signal, optionally wherein the scheduling information identifies radio resources in a frequency domain and/or time domain used by the radio base station to transmit the requested second beamformed reference signal,
  optionally, determining a duration of time during which the second beamformed reference signal is to be provided to the other user equipment.

In case of not providing the second beamformed reference signal to the other user equipment, the radio base station transmits a second reference signal request response to the other radio base station informing that the radio base station will not provide the requested second beamformed reference signal to the other user equipment.

According to an eleventh aspect provided in addition to one of the first to tenth aspects, the processing circuitry determines whether to handover the user equipment to the neighbor radio base station, based on a measurement report received from the user equipment comprising results of measurements performed by the user equipment for the neighbor radio cell. In the positive case, the transmitter transmits a handover request to the neighbor radio base station.

According to a twelfth aspect, a radio base station of a mobile communication system is provided. The radio base station controls transmission of an omni-directional reference signal and a beamformed reference signal in a first radio cell of the radio base station. The radio base station comprises processing circuitry, which determines to transmit information on the beamformed reference signal to one or more neighbor radio base stations. A transmitter of the radio base station transmits a reference signal notification message to the one or more neighbor radio base stations, comprising scheduling information of the beamformed reference signal to allow identifying the radio resources used by the radio base station to transmit the beamformed reference signal.

According to a thirteenth aspect provided in addition to the twelfth aspect, the transmitter transmits the omni-directional reference signal and the beamformed reference signal in the first radio cell. In an optional implementation, the processing circuitry determines whether or not to switch off the transmission of the beamformed reference signal or whether to change the direction of the beamformed reference signal.

According to a fourteenth aspect provided in addition to the twelfth or thirteenth aspects, the reference signal notification message comprises identification information of the first radio cell, and further comprises a list of beams with which the beamformed reference signal will be transmitted. In an optional implementation, for each beam in the list the reference signal notification message includes:
  the scheduling information; and
  duration information about the duration of time the beamformed reference signal will be transmitted by the radio base station; and/or
  periodicity information about the periodicity in time with which the beamformed reference signal will be transmitted by the radio base station.

According to a fifteenth aspect provided in addition to one of the twelfth to fourteenth aspects, the reference signal notification message includes an identification for the beamformed reference signal. The transmitter transmits another reference signal notification message to the one or more neighbor radio base stations comprising the identification of the beamformed reference signal to inform the one or more neighbor radio base stations that the identified beamformed reference signal is now switched on or off.

According to a sixteenth aspect, a user equipment in a mobile communication system is provided. The user equipment comprises processing circuitry, which determines that a neighbor radio base station does not provide a beamformed reference signal to the user equipment. The neighbor radio base station controls the transmission in its neighbor radio cell of an omni-directional reference signal and the beamformed reference signal. A transmitter of the user equipment transmits a reference signal request to a serving radio base station serving the user equipment. The reference signal request requests the serving radio base station to request the neighbor radio base station to provide the beamformed reference signal to the user equipment. A receiver of the user equipment receives from the serving radio base station a notification message, comprising information on the requested beamformed reference signal.

According to a seventeenth aspect provided in addition to the sixteenth aspect, the receiver receives the omni-directional reference signal and the beamformed reference signal. The processing circuitry performs measurements on the omni-directional reference signal and the beamformed reference signal. The processing circuitry prepares a measurement report including results of the performed measurements. In an optional implementation, a measurement result is associated with a flag in the measurement report indicating whether the associated measurement result was calculated based on the omni-directional reference signal and/or the beamformed reference signal, and/or wherein a measurement result is associated with a measurement identification based on which the serving radio base station determines whether the associated measurement result was calculated based on the omni-directional reference signal and/or the beamformed reference signal.

According to an eighteenth aspect provided in addition to the sixteenth or seventeenth aspect, the reference signal request transmitted by the user equipment includes information to identify a neighbor radio cell of the neighbor radio base station and optionally includes information to identify at least a further radio cell for which a corresponding beamformed reference signal is requested. In an optional implementation, the reference signal request is a Medium Access Control, MAC, Control Element, comprising a predetermined logical channel identifier identifying the MAC Control Element to be the reference signal request. Alternatively, the reference signal request is a Packet Data Convergence Protocol, Control Packet Data Unit, a PDCP Control PDU, comprising a predetermined type identifier identifying the PDCP Control PDU to be the reference signal request.

According to a nineteenth aspect provided in addition to the eighteenth aspect, the information to identify the neighbor radio cell is a radio cell identification, or is a bitmap with two or more bits, each of the bits of the bitmap being associated to a result of a measurement in a measurement report prepared by the user equipment for the neighbor cell, each result being associated with a radio cell identification of the neighbor radio cell.

According to a twentieth aspect, a method for operating a radio base station serving a user equipment in a first radio cell of a mobile communication system is provided. The method comprises the following steps performed by the radio base station. It is determined that a neighbor radio base station does not provide a beamformed reference signal to the user equipment. The neighbor radio base station controls the transmission in its neighbor radio cell of an omni-directional reference signal and the beamformed reference signal. A reference signal request is transmitted to the neighbor radio base station, wherein the reference signal request requests the neighbor radio base station to provide the beamformed reference signal to the user equipment. From the neighbor radio base station a reference signal request response to the received, including information on the transmission of the requested beamformed reference signal. A notification message is transmitted to the user equipment, comprising information on the requested beamformed reference signal.

According to a twenty-first aspect, a method for operating a user equipment in a mobile communication system is provided. The method comprises the following steps performed by the user equipment. It is determined that a neighbor radio base station does not provide a beamformed reference signal to the user equipment. The neighbor radio base station controls the transmission in its neighbor radio cell of an omni-directional reference signal and the beamformed reference signal. A reference signal request is transmitted to a serving radio base station serving the user equipment. The reference signal request requests the serving radio base station to request the neighbor radio base station to provide the beamformed reference signal to the user equipment. A notification message is received from the serving radio base station, comprising information on the requested beamformed reference signal.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A radio base station serving a user equipment in a first radio cell of a mobile communication system, the radio base station comprising:
   processing circuitry, which in operation, determines that a neighbor radio base station does not provide a beamformed reference signal to the user equipment, the neighbor radio base station controlling the transmission in its neighbor radio cell of an omni-directional reference signal and the beamformed reference signal;
   a transmitter, which in operation, transmits a reference signal request to the neighbor radio base station, wherein the reference signal request requests the neighbor radio base station to provide the beamformed reference signal to the user equipment;
   a receiver, which in operation, receives from the neighbor radio base station a reference signal request response, including information on the transmission of the requested beamformed reference signal; and
   the transmitter, which in operation, transmits a notification message to the user equipment, comprising information on the requested beamformed reference signal.

2. The radio base station according to claim 1, wherein the reference signal request response informs that the neighbor radio base station will not provide the requested beamformed reference signal to the user equipment, wherein the notification message transmitted to the user equipment informs on that the requested beamformed reference signal will not be provided to the user equipment.

3. The radio base station according to claim 1, wherein the reference signal request response informs that the neighbor radio base station will provide the requested beamformed reference signal to the user equipment, wherein the reference signal request response further includes scheduling information for the requested beamformed reference signal, wherein the scheduling information identifies radio resources in at least one of a frequency domain and a time domain, and
   wherein the notification message transmitted to the user equipment comprises scheduling information for the requested beamformed reference signal such that the user equipment can receive the requested beamformed reference signal.

4. The radio base station according to claim 1, wherein the reference signal request includes information to derive the position of the user equipment, wherein this information to derive the position includes global positioning system coordinates or relative measurement results calculated from the measurement report received from the user equipment or the measurement report received from the user equipment, and
   wherein the reference signal request further includes identification information of the neighbor radio cell.

5. The radio base station according to claim 1, wherein the reference signal request response includes a list of beams with which the requested beamformed reference signal will be transmitted, wherein for each beam in the list the reference signal request response includes at least one of:

duration information about the duration of time the requested beamformed reference signal will be transmitted by the neighbor radio base station; and periodicity information about the periodicity in time with which the requested beamformed reference signal will be transmitted by the neighbor radio base station.

6. The radio base station according to claim 1, wherein the receiver, when in operation, receives from the user equipment a measurement report, including one or more results of measurements performed by the user equipment at least on the neighbor radio cell, wherein the processing circuitry, when in operation, determines that the neighbor radio base station does not provide the beamformed reference signal to the user equipment based on the received measurement report and determines to transmit the reference signal request to the neighbor radio base station, in case the one or more measurement results on the neighbor radio cell comprise results of measurements performed by the user equipment based on the omni-directional reference signal but do not comprise results of measurements performed by the user equipment based on the requested beamformed reference signal, and wherein a measurement result is associated with a flag in the measurement report indicating whether the associated measurement result was calculated based at least on one of the omni-directional reference signal and the beamformed reference signal, and/or wherein a measurement result is associated with a measurement identification based on which the processing circuitry, when in operation, determines whether the associated measurement result was calculated based at least on one of the omni-directional reference signal and the beamformed reference signal.

7. The radio base station according to claim 1, wherein the receiver, when in operation, receives from the user equipment a user-equipment-initiated reference signal request requesting the beamformed reference signal to be provided by the neighbor radio base station, the processing circuitry, when in operation, determines that the neighbor radio base station does not provide a beamformed reference signal to the user equipment based on the received user-equipment-initiated reference signal request, and the processing circuitry, when in operation, determines to transmit the reference signal request to the neighbor radio base station, based on the received user-equipment-initiated reference signal request.

8. The radio base station according to claim 7, wherein the user-equipment-initiated reference signal request includes information to identify the neighbor radio cell and includes information to identify at least a further radio cell for which a corresponding beamformed reference signal is requested, wherein the user-equipment-initiated reference signal request is a Medium Access Control (MAC) Control Element, comprising a predetermined logical channel identifier identifying the MAC Control Element to be the user-equipment-initiated reference signal request, or wherein the user-equipment-initiated reference signal request is a Packet Data Convergence Protocol, Control Packet Data Unit (PDCP Control PDU), comprising a predetermined type identifier identifying the PDCP Control PDU to be the user-equipment-initiated reference signal request.

9. The radio base station according to claim 1, wherein the omni-directional reference signal is achieved by at least one of: transmitting a same in all directions at substantially the same time, and transmitting a same in a form of a beam whose direction is successively changed in time so as to be thus transmitted in all directions.

10. The radio base station according to claim 1, wherein the radio base station controls transmission of a second omni-directional reference signal in the first radio cell and transmission of a second beamformed reference signal in the first radio cell, wherein the receiver, when in operation, receives a second reference signal request from another radio base station requesting to provide the second beamformed reference signal to another user equipment, wherein the processing circuitry, when in operation, determines whether or not to provide the second beamformed reference signal to the other user equipment, and in case of providing the second beamformed reference signal to the other user equipment, the radio base station at least performs one of the following:

at least one of switching on the transmission of the second beamformed reference signal, and changing at least one of the direction and the transmission power of the second beamformed reference signal such that the other user equipment is able to receive the second beamformed reference signal;

transmitting scheduling information to the other radio base station for the requested second beamformed reference signal, wherein the scheduling information identifies radio resources at least in one of a frequency domain and time domain used by the radio base station to transmit the requested second beamformed reference signal;

determining a duration of time during which the second beamformed reference signal is to be provided to the other user equipment; and in case of not providing the second beamformed reference signal to the other user equipment, the radio base station transmits a second reference signal request response to the other radio base station informing that the radio base station will not provide the requested second beamformed reference signal to the other user equipment.

11. The radio base station according to claim 1, wherein the processing circuitry, when in operation, determines whether to handover the user equipment to the neighbor radio base station, based on a measurement report received from the user equipment comprising results of measurements performed by the user equipment for the neighbor radio cell, wherein in a positive case, the transmitter, when in operation, transmits a handover request to the neighbor radio base station.

12. A user equipment in a mobile communication system, the user equipment comprising:

processing circuitry, which in operation, determines that a neighbor radio base station does not provide a beamformed reference signal to the user equipment, the neighbor radio base station controlling the transmission in its neighbor radio cell of an omni-directional reference signal and the beamformed reference signal;

a transmitter, which in operation, transmits a reference signal request to a serving radio base station serving the user equipment, wherein the reference signal request requests the serving radio base station to request the neighbor radio base station to provide the beamformed reference signal to the user equipment; and a receiver, which in operation, receives from the serving radio base station a notification message, comprising information on the requested beamformed reference signal.

13. The user equipment according to claim 12, wherein the receiver, when in operation, receives the omni-directional reference signal and the beamformed reference signal,
the processing circuitry, when in operation, performs measurements on the omni-directional reference signal and the beamformed reference signal, and
the processing circuitry, when in operation, prepares a measurement report including results of the performed measurements,
wherein a measurement result is associated with a flag in the measurement report indicating whether the associated measurement result was calculated based on at least one of the omni-directional reference signal and the beamformed reference signal, and/or wherein a measurement result is associated with a measurement identification based on which the serving radio base station determines whether the associated measurement result was calculated based on at least one of the omni-directional reference signal and the beamformed reference signal.

14. The user equipment according to claim 12, wherein the reference signal request transmitted by the user equipment includes information to identify a neighbor radio cell of the neighbor radio base station and includes information to identify at least a further radio cell for which a corresponding beamformed reference signal is requested, wherein the reference signal request is a Medium Access Control (MAC) Control Element, comprising a predetermined logical channel identifier identifying the MAC Control Element to be the reference signal request, or wherein the reference signal request is a Packet Data Convergence Protocol, Control Packet Data Unit (PDCP Control PDU), comprising a predetermined type identifier identifying the PDCP Control PDU to be the reference signal request.

15. The user equipment according to claim 14, wherein the information to identify the neighbor radio cell is a radio cell identification, or is a bitmap with two or more bits, each of the bits of the bitmap being associated to a result of a measurement in a measurement report prepared by the user equipment for the neighbor cell, each result being associated with a radio cell identification of the neighbor radio cell.

* * * * *